United States Patent [19]
Wada et al.

[11] Patent Number: 6,023,537
[45] Date of Patent: Feb. 8, 2000

[54] IMAGE READING APPARATUS USING AN IMAGE READING POSITION ERROR MEASURING DEVICE

[75] Inventors: Shinichiro Wada, Kawasaki; Koichi Noguchi, Machida, both of Japan

[73] Assignee: Ricoh Company, Ltd., Tokyo, Japan

[21] Appl. No.: 08/886,360

[22] Filed: Jul. 1, 1997

[30]    Foreign Application Priority Data

Jul. 15, 1996 [JP] Japan ..................................... 8-185012
Jul. 19, 1996 [JP] Japan ..................................... 8-190998

[51] Int. Cl.$^7$ ....................................................... G06K 7/00
[52] U.S. Cl. ........................... 382/312; 318/318; 358/505
[58] Field of Search ..................................... 382/312, 199, 382/195, 266, 318, 319, 313; 359/18, 209, 216, 212; 358/483, 505, 530, 296, 448, 462

[56]    References Cited

U.S. PATENT DOCUMENTS

| | | | |
|---|---|---|---|
| 5,402,409 | 3/1995 | Kataoka et al. | 358/296 |
| 5,485,288 | 1/1996 | Kamei et al. | 358/530 |
| 5,666,213 | 9/1997 | Ohshita et al. | 358/448 |

FOREIGN PATENT DOCUMENTS 6-297758  10/1994  Japan .

OTHER PUBLICATIONS

Shunsuke Hattori, et al., "A Development of Image Scanner of High Resolution", Japan Society of Mechanical Engineers, lecture paper collection (IV), Mar. 29–31, 1994, Tokyo, pp. 673–675.

Koujiro Ohshima, et al., "Base and Application of Servo Sensor", Feb. 20, 1988, pp. 151–154.

*Primary Examiner*—Jose L. Couso
*Assistant Examiner*—Anh Hong Do
*Attorney, Agent, or Firm*—Oblon, Spivak, McClelland, Maier & Neustadt, P.C.

[57]    ABSTRACT

An oblique line pattern is located outside of an effective image area and comprises a plurality of lines with a fixed inclination to the main scan direction. A reading unit, extending in the main scan direction, reads the oblique line pattern together with an original image which is placed in the effective image area. A setting portion is provided for an operator to set an image size change rate for the original image. A sub-scanning portion changes an original image scanning speed in a sub-scan direction according to the image size change rate. A first calculating portion sets a window on image data of the oblique line pattern obtained through the reading unit, and calculates a center of gravity of the image data in the window. A controlling portion controls movement of the window according to a value of the center of gravity obtained through the first calculating portion. A second calculating portion obtains an image reading position error for each main scan line based on the value of the center of gravity and the image size change rate.

7 Claims, 27 Drawing Sheets

FIG. I
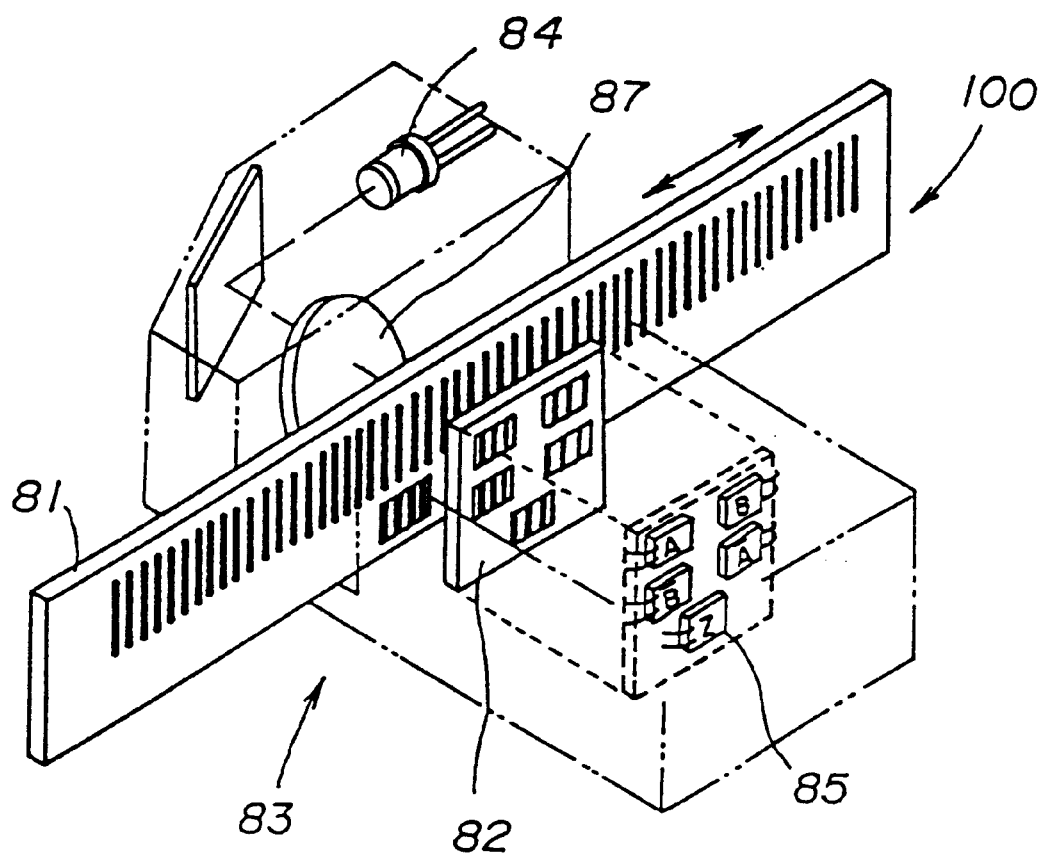

FIG. 2B LIGHT INTENSITY CHANGE (TRIANGLE WAVE)

FIG. 2C ACTUAL OUTPUT WAVEFORM (APPROXIMATE SINE WAVE)

|    | X1 | X2  | X3  | X4  | X5  | X6  | X7  | X8  | X9  |
|----|----|-----|-----|-----|-----|-----|-----|-----|-----|
| Y1 | 2  | 3   | 1   | 4   | 2   | 18  | 220 | 250 | 248 |
| Y2 | 2  | 1   | 2   | 3   | 13  | 216 | 248 | 250 | 252 |
| Y3 | 3  | 2   | 4   | 8   | 201 | 250 | 252 | 252 | 251 |
| Y4 | 2  | 3   | 4   | 183 | 251 | 254 | 252 | 249 | 32  |
| Y5 | 3  | 5   | 157 | 250 | 251 | 252 | 251 | 50  | 4   |
| Y6 | 2  | 130 | 249 | 250 | 251 | 250 | 62  | 5   | 3   |

FIG. 9A

| | X2 | X3 | X4 |
|---|---|---|---|
| Y1 | 3 | 1 | 4 |
| Y2 | 1 | 2 | 3 |
| Y3 | 2 | 4 | 8 |

FIG. 9B

| | X3 | X4 | X5 |
|---|---|---|---|
| Y1 | 1 | 4 | 2 |
| Y2 | 2 | 3 | 13 |
| Y3 | 4 | 8 | 201 |

FIG. 9C

| | X4 | X5 | X6 |
|---|---|---|---|
| Y1 | 4 | 2 | 18 |
| Y2 | 3 | 13 | 216 |
| Y3 | 8 | 201 | 255 |

FIG. 9D

| | X5 | X6 | X7 |
|---|---|---|---|
| Y1 | 2 | 18 | 220 |
| Y2 | 13 | 216 | 248 |
| Y3 | 201 | 250 | 252 |

FIG. 9E

| | X6 | X7 | X8 |
|---|---|---|---|
| Y1 | 18 | 220 | 250 |
| Y2 | 216 | 248 | 250 |
| Y3 | 250 | 252 | 252 |

FIG.10A

| | X2 | X3 | X4 |
|---|---|---|---|
| Y1 | 0 | 0 | 0 |
| Y2 | 0 | 0 | 0 |
| Y3 | 0 | 0 | 0 |

FIG.10B

| | X3 | X4 | X5 |
|---|---|---|---|
| Y1 | 0 | 0 | 1 |
| Y2 | 0 | 0 | 0 |
| Y3 | 0 | 0 | 0 |

FIG.10C

| | X4 | X5 | X6 |
|---|---|---|---|
| Y1 | 0 | 0 | 0 |
| Y2 | 0 | 0 | 1 |
| Y3 | 0 | 1 | 1 |

FIG.10D

| | X5 | X6 | X7 |
|---|---|---|---|
| Y1 | 0 | 0 | 1 |
| Y2 | 0 | 1 | 1 |
| Y3 | 1 | 1 | 1 |

FIG.10E

| | X6 | X7 | X8 |
|---|---|---|---|
| Y1 | 0 | 1 | 1 |
| Y2 | 1 | 1 | 1 |
| Y3 | 1 | 1 | 1 |

|  | X0 | X1 | X2 | X3 | X4 | X5 | X6 | X7 | X8 | X9 |
|---|---|---|---|---|---|---|---|---|---|---|
| Y0 | 4 | 4 | 10 | 40 | 150 | 241 | 202 | 120 | 22 | 6 |
| Y1 | 4 | 6 | 42 | 148 | 240 | 200 | 122 | 20 | 10 | 4 |
| Y2 | 10 | 40 | 150 | 239 | 200 | 121 | 21 | 10 | 5 | 4 |

18  50  202  427  590  562  345  150  37  14

IMAGE READING APPARATUS USING AN IMAGE READING POSITION ERROR MEASURING DEVICE

BACKGROUND OF THE INVENTION

1. Field of the Invention

The present invention relates to an image reading position error measuring device which measures an image reading error from bit-map formation image data obtained from reading images through a reading device.

2. Description of the Related Art

As a first example of the related art, Shunsuke Hattori et al. disclose *A Development of Image Scanner of High Resolution* in the Japan Society of Mechanical Engineers, 71st ordinary general meeting, lecture meeting, lecture paper collection (IV) [Mar. 29–31, 1994, Tokyo]. Therein, an interpolation operation is performed on image data which is obtained as a result of reading a test chart having even-pitch lines arranged therein in a sub-scan direction. That image data is image data which is discrete in those sub-scan direction line intervals. From the interpolation operation result, the central positions of black lines and white lines of the even-pitch lines are obtained. Then, differences between the central positions and the reference pitch of the test chart are read. Thereby, image data reading position errors due to apparatus vibration or the like is detected.

As a second example of the related art, Japanese Laid-Open Patent Application No.6-297758 discloses *A Scan-line Pitch Measuring Method*. Therein, a pattern of a hard copy having even-pitch pattern data written therein is read. Thereby, unevenness in the pitch of scan lines which are used in a hard-copy apparatus is measured.

An optical linear scale (as a third example of the related art), for example, is disclosed in *Base and Application of Servo Sensor* written by Koujiro Ohshima and Yuji Akiyama, published by the Ohm company on Feb. 20, 1988. The disclosure in this publication will now be described with reference to FIGS. 1, 2A, 2B, 2C and 3.

Here, as an example of the linear scale, a position scale is used. The linear scale in the example, as shown in FIG. 1, includes a glass scale 83, a light source 84 and photo diodes 85. The glass scale 83 includes one set of a main scale 81 and an index scale 82, each scale having completely even-pitch light and shade stripe series. The LED light source 84 lights the scale 83. The photodiodes 85 detect light which has passed through the scale 83. Ordinarily, the index scale 82 is fixed and the main scale moves. As the main scale moves, the outputs of the photodiodes change.

As shown at the left of FIG. 2A, when the transmitting portions of the two glasses are aligned, the light output having passed through the glasses 81 and 82 is maximum. As shown at the right of FIG. 2A, when the transmitting portions of one glass are aligned with the chrome-deposited non-transmitting portions of the other glass, the light output having passed through the glasses 81 and 82 is zero. Accordingly, the light output waveform is ideally that shown in FIG. 2B. However, actually, because the stripe series light and shade pitch is as small as 8 μm, due to influence of light diffraction and reflection on the chrome-deposited surfaces, an approximate sine wave is output, as shown in FIG. 2C. The span between each of the adjacent peaks of the output waveform corresponds to each pitch of the scale. Accordingly, by counting the peaks, an amount of movement of the main scale 81 can be known. This is the basic principle of the position scale. Actually, various processes are performed using the four photodiodes A, B, $\overline{A}$, $\overline{B}$.

The four stripe series of the index scale 82 are aligned with the four photodiodes A, B, $\overline{A}$, $\overline{B}$, respectively. The phase relationship among the four stripe series of the index scale 82 are 0°, 90°, 180° and 270°. The outputs of the four photodiodes A and $\overline{A}$ are combined and B and $\overline{B}$ are combined and differential operations are performed on each combination of the outputs. Thus, even if the scale 82 gets dirty and/or the light intensity of the light source 84 changes, an accurate result can be obtained. Thus, reliability is improved. The obtained signals will be referred to as 'A signal' and 'B signal'. The signals obtained as a result of electrically inverting these signals are referred to as '$\overline{A}$ signal' and '$\overline{B}$ signal'. Using these signals, a process of reading a smaller size is performed.

The direction in which the main scale 81 moves can be determined as a result of knowing which of the A signal and B signal leads in phase, as shown in FIG. 3. In order to read a size smaller than each pitch of the scale 83, using only the A signal, by taking a position at which the signal crosses the reference level from the lower side and a position at which the signal crosses the reference level from the higher side, the amount of movement of the scale can be read every 4 μm. In order to read more finely, it is necessary to produce a 45° phase difference signal using the A signals and B signal, and also, produce a 135° phase difference signal using the B signal and $\overline{A}$ signal.

In the above-described first example of the related art, due to possible spatial differences between the edges of the even-pitch lines and sampling positions, 'Moire' effect may occur wherein a difference occurs between data which has been obtained as a result of reading the same pattern. Due to the Moire effect, thus-obtained read data may not be data which indicates positions corresponding to the edges of the pattern. Thereby, accuracy in measuring image reading position errors may be degraded. Such an adverse effect is very noticeable when the even-pitch line pattern is so fine as to approximate the resolution of the reading apparatus. As a result, the measuring of image reading position errors may not be performed. Thus, using this method, it is not possible to measure, with a high accuracy, an image reading position error of a pattern which is so fine as to approximate or to be more than the resolution of the reading apparatus.

Further, because an even-pitch line pattern is used, even if the Moire effect is ignored, in a case where the pitch of the pattern is fine for measuring an image reading position error of a high-frequency component, due to the limitation of the MTF (Modulation Transfer Ratio) of the image formation system, a difference in a signal indicating image tone is disadvantageously reduced. Thus the measuring accuracy is degraded.

It is considered that, in the case where the pitch of the pattern is finer, the measuring frequency band is widened to a higher frequency. Thereby, it is not possible to provide a high measuring accuracy. Therefore, in order to solve this problem, the sampled data is made to undergo an interpolation operation. In order to improve the effect of the interpolation operation, it is necessary to increase an amount of surrounding data to be processed. As a result, a longer time is required for the operation. Further, the interpolation operation inherently may not provide true data, and thus the measuring accuracy may be degraded. Further, in the first example, image data to be used is obtained as a result of a specific light-reception element of the light-to-electricity converting device being used to scan the pattern in the sub-scan direction. The light-reception element itself may provide noise which may degrade the measuring accuracy.

In the above-described method of measuring in the second example of the related art, the light-to-electricity converting device is used to read the pattern and thus-obtained data is used. In this method, at this time, reading or scanning unevenness when reading or scanning a hard copy is not considered in measuring pitch unevenness in the pattern of the hard copy. Further, this method also has a 'Moire' effect problem similar to that which occurs in the above-described first example of the related art.

In the above-described method of the third example of the related art, in the above-described linear scale, light emitted by the light source (LED) 84 becomes parallel light through a collimate lens 87. Then, light passing through the main scale 81 and index scale 82 is detected by the photodiodes. Accordingly, it is necessary to prepare a finely divided highly-accurate main scale 81 and index scale 82 and an accurate collimating lens is necessary. As a result, costs increase.

Therefore, the present applicant proposed solutions of the above-described problems in Japanese Patent Application Nos.7-256481 and 7-311015, and U.S. patent application Ser. No. 08/698,854.

However, the prior applications consider a case where equal size image reading (same-size image reading) is performed and do not consider a case where image size change reading is performed.

A case of performing image size change (image magnification or image size reduction of the read image) processing will now be described. Ordinarily, image size change processing is performed in an image reading apparatus, with regard to a sub scan direction, an having a changed size image is produced as a result of changing the carriage scanning speed. With regard to a main scan direction, an image size change is performed in image data processing. Accordingly, when the position error measuring portion is provided at the stage subsequent to processing of the main scan direction image size change, the angle of the oblique line in the read image is 45° when the angle of the oblique line is 45°. However, in the read image of the oblique line, the line width in the main scan line direction changes. When the magnification is large, the line width is large. When the magnification is small, the line width is small. Therefore, it is necessary to change the size of the window according to the magnification. When changing the window size according to the magnification, the gravity measuring time is different, and an error may occur in the position error measurement.

SUMMARY OF THE INVENTION

The present invention has been devised in consideration of the foregoing point, and, a first object of the present invention is to provide an image reading position error measuring device in which image position errors can be accurately measured even when image size change processing is performed.

A second object of the present invention is to effectively control window movement according to inclination of an oblique line.

A third object of the present invention is to enable highly accurate successive measurement of image reading position errors in the sub-scan direction without much enlargement of the size of the window.

A fourth object of the present invention is to provide an image reading apparatus in which image reading position error measurement can be simplified when performing image size change processing. An image reading position error measuring device, according to the present invention, comprises:

an oblique line pattern, located outside of an effective image area, comprising a plurality of lines with a fixed inclination to a main scan direction;

reading means, extending in the main scan direction, for reading the oblique line pattern together with an original image which is placed in the effective image area;

setting means for setting an image size change rate for the original image;

sub-scanning means which changes an original mage scanning speed in a sub-scan direction appropriately according to the image size change rate;

first calculating means for setting a window on image data of the oblique line pattern obtained through the reading means, and calculating a center of gravity of the image data in the window;

controlling means for controlling movement of the window appropriately according to a value of the center of gravity obtained through the first calculating means; and second calculating means for obtaining an image reading position error for each main scan line based on the value of the center of gravity and the image size change rate.

Thereby, although the image size change rate is changed, the image reading position error can be accurately measured.

Another image reading apparatus, according to the present invention, comprises:

an oblique line pattern, located outside of an effective image area, comprising a plurality of lines with a fixed inclination to the main scan direction;

reading means, extending in the main scan direction, for reading the oblique line pattern together with an original image which is placed in the effective image area;

setting means for setting an image size change rate for the original image;

sub-scanning means which changes an original image scanning speed in a sub-scan direction appropriately according to the image size change rate;

calculating means for obtaining an image reading position error for each main scan line based on image data of the oblique line pattern obtained through the reading means;

image size changing means for converting image data of the original image so that a size of an image of the image data be changed appropriately according to the image size change rate in the main scan direction.

Thereby, because the image reading position error of the image, the size of which is not changed in the main scan direction, can be obtained, the accuracy of the image reading position error can be maintained and also the image reading position error measuring process can be simplified.

Another image reading apparatus, according to the present invention, comprises:

an oblique line pattern, located outside of an effective image area, comprising a plurality of lines with a fixed inclination to the main scan direction;

reading means, extending in the main scan direction, for reading, through an optical system, the oblique line pattern together with an original image which is placed in the effective image area;

setting means for setting an image size change rate for the original image;

image size changing means for changing a reading image size as a result of changing an arrangement of the optical system appropriately according to the image size change rate;

sub-scanning means which changes an original image scanning speed in a sub-scan direction appropriately according to the image size change rate;

converting means for obtaining image data of the oblique line pattern, a size of an image of the image data being not changed in the main scan direction, based on image data of the oblique line pattern, obtained through the reading means, and the image size change rate; and calculating means for obtaining an image reading position error for each main scan line based on the image data of the oblique line pattern obtained through the converting means.

Thereby, because the image reading position error of the image, the size of which is not changed in the main scan direction, can be obtained, the accuracy of the image reading position error can be maintained and also the image reading position error measuring process can be simplified.

Other objects and further features of the present invention will become more apparent from the following detailed description when read in conjunction with the accompanying drawings.

BRIEF DESCRIPTION OF THE DRAWINGS

FIG. 1 shows a perspective view of a general arrangement of a linear scale in the related art;

FIGS. 2A, 2B and 2C show the detection principle of the linear scale shown in FIG. 1;

FIGS. 9A, 9B, 9C, 9D and 9E show an oblique-line determining window;

FIGS. 10A, 10B, 10C, 10D and 10E illustrate another example of the method of the oblique line determination operation;

DETAILED DESCRIPTION OF THE PREFERRED EMBODIMENTS

1. First Embodiment

A first embodiment of the present invention will now be described.

1.1 Measurement Principle

Figure 2A:
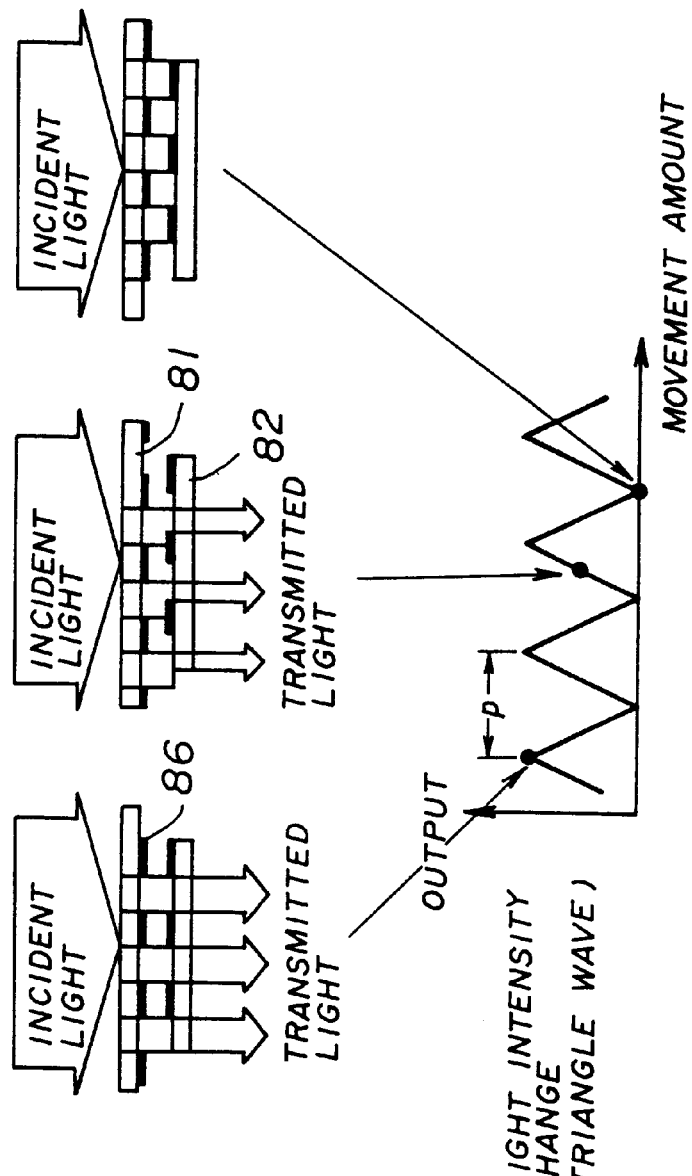
Figure 3:
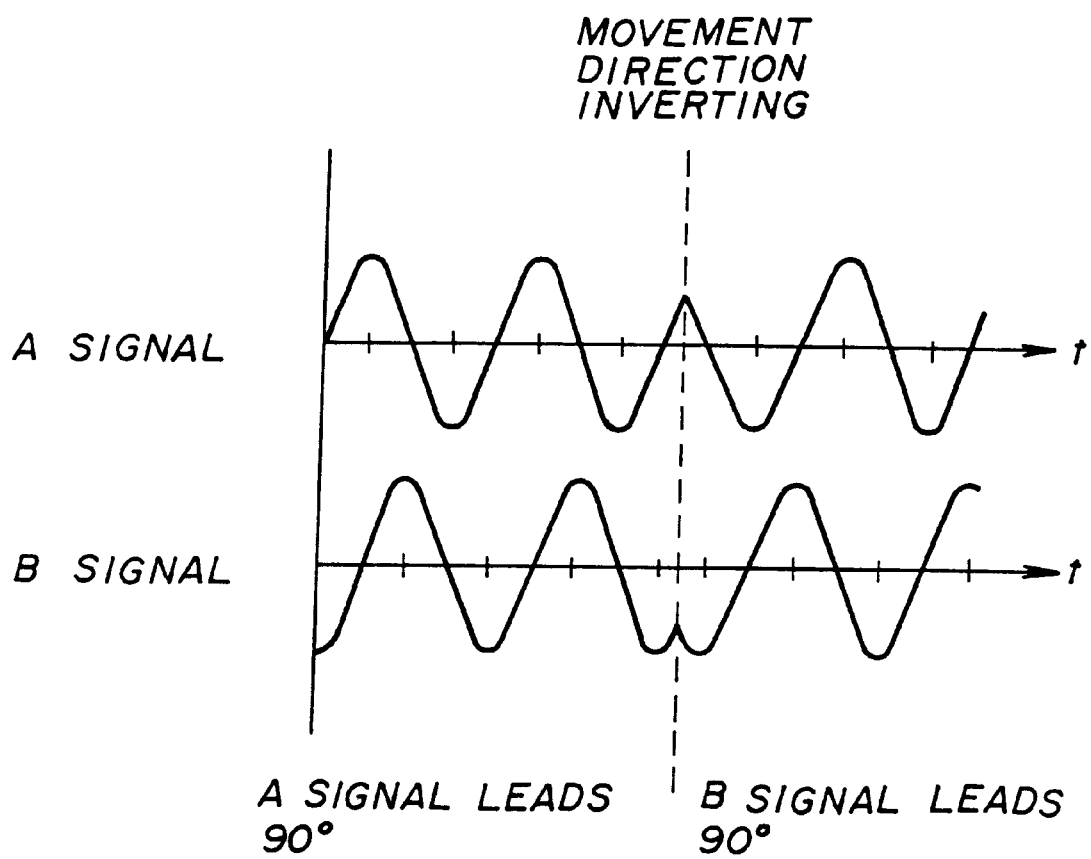
FIG. 3 shows a method of determining a moving direction of the linear scale shown in FIG. 1.
Figure 4:
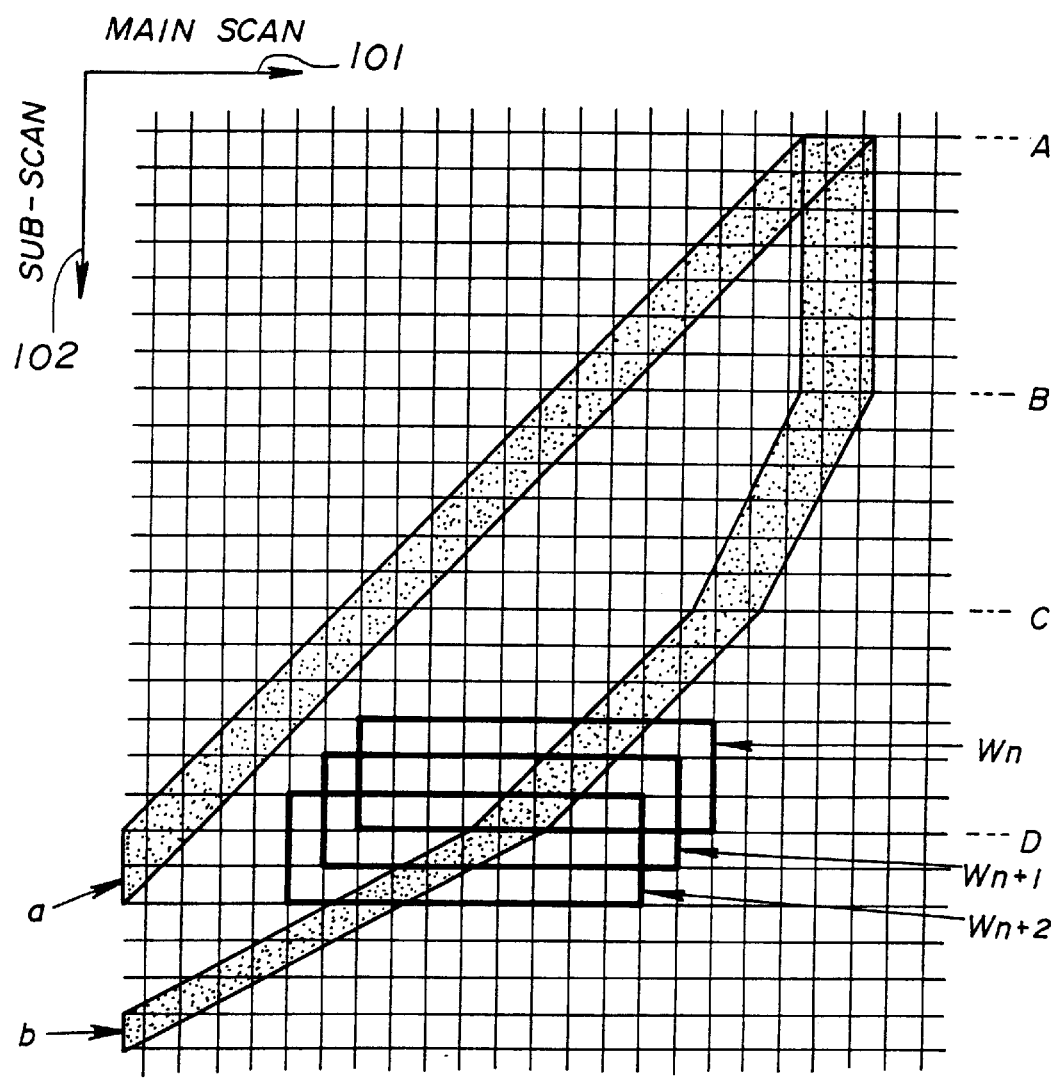
FIG. 4 illustrates the image reading position error measurement principle of a first embodiment of the present invention.

FIG. 4 illustrates a measurement principle of an image reading position error measuring device in a first embodiment of the present invention. An arrow 101 indicates a main scan direction. An arrow 102 indicates a sub-scan direction. An original image may be read, scan line by scan line, and thus each scan line of the image may be read at the same time. Thus, pixels forming a scan line are read in parallel. The thus-read scan line of pixels may be output in series, in the main scan direction order. After the thus-read scan line of pixels is processed, a reading area is moved to the subsequent scan line of the original image in a direction indicated by the arrow 102, the scan line of the image is read, and the thus-read scan line of pixels is processed. Thus, a sequence of scan lines of the original image are read, and the thus-read sequence of scan lines of pixels are processed. That movement of the reading area may be achieved by movement of a mirror for projecting the original image onto a component converting light to electricity and an illumination lamp, by movement of the original image, by movement of a unit of the light-to-electricity converting component and its image formation system, or the like. In this case, each square, shown in the figure, which is defined by lines in the main scan direction and lines in the sub-scan direction, is treated as a respective pixel. An area consisting of those pixels is also treated as a mapped image or as a bit-map which is obtained as a result of arranging image data carried by an electric signal which is obtained from the original image as a result of converting light to electricity. In a case where an image reading apparatus outputs the thus-read pixels in a real-time manner, the main scan direction 101 and sub-scan direction 102 indicate the pixel order on the time axis. However, after the pixel data is stored in a memory, any pixel can be accessed, and thus it is possible to treat those pixels without regard to the main scan direction and sub-scan direction order on the time axis.

FIG. 4 shows a case where each pixel is such that the size thereof in the main scan direction is equal to the size thereof in the sub-scan direction. A line image 'a' shown in the figure is obtained as a result of reading a 45° oblique line in a condition where a scanning speed in the sub-scan direction is fixed to be a predetermined speed. That is, the scanning speed in the sub-scan direction precisely corresponds to clock pulses which are provided for controlling sub-scan direction reading timing. A line image 'b' shown in the figure is obtained as a result of reading a 45° oblique line in a condition where the scanning speed in the sub-scan direction varies. Each of the line images 'a' and 'b' is thus formed in the bit-map which is obtained as a result of arranging image data carried by the electrical signal which is obtained from the original 45° oblique line, as shown in the figure. As shown in the figure, in the case where the original 45° oblique line image is read in the condition where the scanning speed in the sub-scan direction is fixed, the identical 45° oblique line image 'a' is formed in the bit-map. In contrast to this, in the case where the original 45° oblique line is read in the condition where the scanning speed in the sub-scan direction changes, the line image 'b' formed in the bit-map has different inclinations according to the changing scanning speeds.

In detail, with regard to the line image 'b', a portion between A–B in the sub-scan direction 102 is formed where the scanning speed in the sub-scan direction is 0. In that condition, although a bit-map address in the sub-scan direction advances according to the above-mentioned clock pulses for controlling the sub-scan direction reading timing, the reading area on the original image does not shift. Thereby, that portion of the line 'b' extends in the sub-scan direction as shown in the figure.

A portion between B–C in the sub-scan direction 102 is formed where the scanning speed in the sub-scan direction is ½ the predetermined speed. In this condition, as the bit-map address advances according to the clock pulses, the reading area on the original image shifts ½ a predetermined distance. Thereby, the angle Θ between this position of the line 'b' and the sub-scan direction is approximately 26.57° because tan Θ=0.5.

A portion between C–D in the sub-scan direction 102 is formed where the scanning speed in the sub-scan direction is fixed to be the predetermined speed. Thereby, the angle of this portion of the line 'b' between the sub-scan direction 102 is 45°.

A portion between D–E in the sub-scan direction 102 is formed where the scanning speed in the sub-scan direction is 1.5 times the predetermined speed. In this condition, as the bit-map address advances according to the clock pulses, the reading area on the original image shifts 1.5 times the predetermined distance. Thereby, the angle Θ between this position of the line 'b' and the sub-scan direction is approximately 56.31° because tan Θ=1.5.

Figure 25:
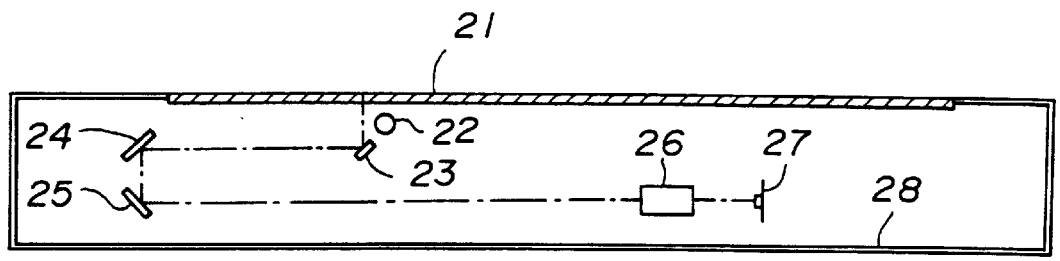
FIG. 25 shows a sectional elevational view of an image reading apparatus in the second embodiment.

Thus, the inclination of the read line image 'b' changes depending on the scanning speed in the sub-scan direction. In other words, the moving speed of a portion of the original 45° oblique line image in the main scan direction, which portion is being currently read, depends on the scanning speed in the sub-scan direction. By detecting such a phenomenon, an image reading position error in a bit-map image due to unevenness in the sub-scan direction scanning speed, vibrations of mirrors (such as mirrors 23, 24, 25 shown in FIG. 25), a lens (such as a lens 26 shown in FIG. 25) and so forth of the image formation system, the light-to-electricity converting device (CCD) (such as device 27 shown in FIG. 25) and so forth of the image reading apparatus, is measured. (Although FIG. 25 shows an internal arrangement of the second embodiment, the first embodiment can also be applied to the image reading apparatus having the arrangement shown in FIG. 25.)

The above descriptions are based on the assumption that each pixel has a square shape and the 45° oblique line is used. However, it is not necessary to be limited to such an assumption. For example, it is not necessary that each pixel has a square shape. Further, it is not necessary that such a 45° oblique line is used. For example, it is possible to apply this measurement principle to image data obtained in an image reading apparatus having a main scan direction resolution of 400 dpi and a sub-scan direction resolution of 600 dpi. The relationship that a moving speed of a portion of an oblique line image in the main scan direction, which portion is being currently read, depends on a scanning speed in the sub-scan direction is applied even if the oblique line to be used is not an oblique line having a 45° angle from the sub-scan direction. Therefore, image reading position errors can be measured by using the same measurement principle.

1.2 System Configuration

Figure 5:
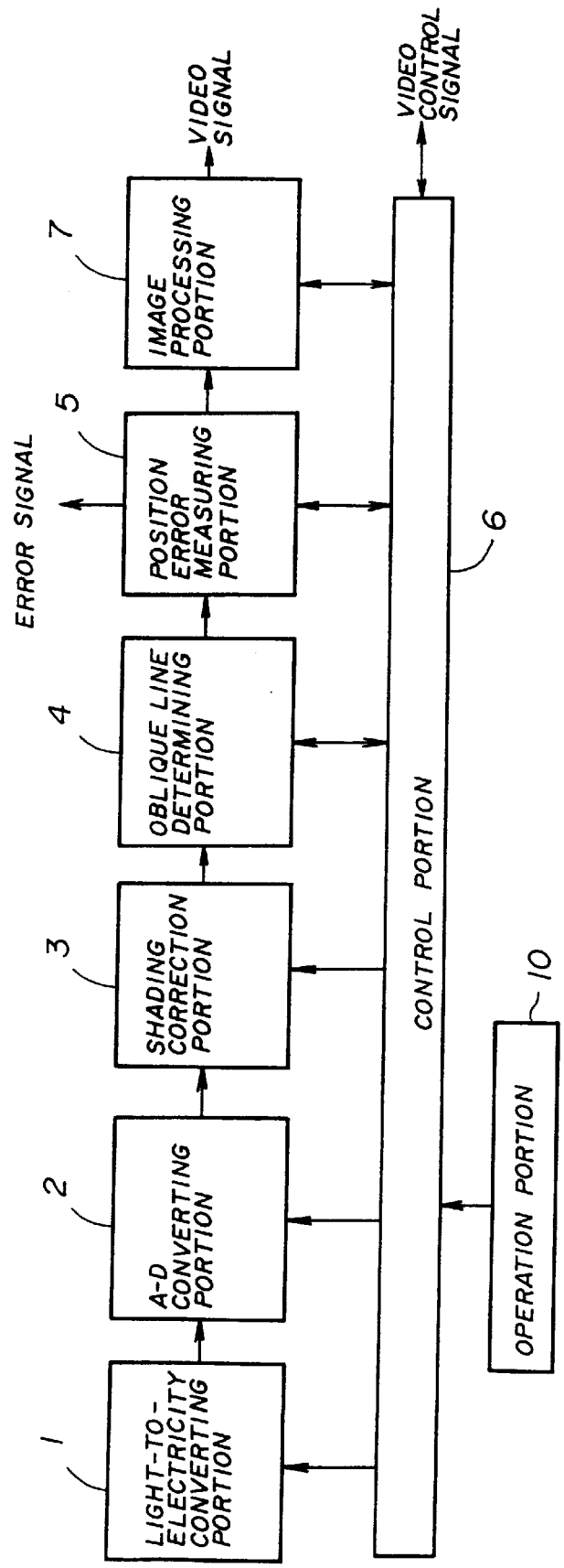
FIG. 5 shows a block diagram of a system arrangement of the first embodiment of the present invention.

FIG. 5 shows a block diagram of a basic system configuration of an image reading apparatus in the first embodiment of the present invention. This image reading apparatus incorporates the above-mentioned image reading position error measurement device. The image reading position error measurement device measures image reading position errors in a real-time manner in the image reading apparatus. Basically, this image reading apparatus includes a light-to-electricity converting portion 1, an A-D converting portion (or A-D converter) 2, a shading correcting portion 3, an oblique line determining portion 4, a position error measuring portion 5, a control portion 6 and an image processing portion 7.

The light-to-electricity converting portion 1 includes, for example, a line of light-to-electricity converting components, such as a line CCD (Charged-Coupled Device). Thereby, an original image is read and is converted into an electrical signal. The obtained electrical signal representing the original image is converted into digital, multilevel image data through the A-D converting portion 2. The obtained image data undergoes a shading correction performed by the shading correcting portion 3. Specifically, a shading error, included in the image data, due to illumination unevenness, lens periphery light intensity reduction, unevenness in sensitivity of the line of the light-to-electricity converting components among respective pixels, is compensated. The obtained image data is input to the oblique line determining portion 4 which determines an oblique line image of the image data. The determination result is provided to the control portion 6. Further, the image data is input to the position error measuring portion 4 which outputs an error signal as a result of the measurement. Simultaneously, the position error measuring portion 4 outputs the image data as a video signal to the image processing portion 7. The image processing portion 7 performs a main scan line image size change, a MTF correction, a γ correction and so forth. Those respective function blocks operate under control by the control portion 6. Specifically, the control portion 6 controls the timing according to which those function blocks operate, and sets operation conditions of those function blocks. An operation portion 10 is connected to the control portion 6. Through the operation portion 10, an operator sets an image size change rate. The control portion 6 externally sends/receives an appropriate video control signal. The video control signal includes a well-known synchronization signal for taking synchronization of a video signal which carries image data, and a well-known gate signal which indicates effective portions of the image data. For example, the image reading apparatus is a digital copying machine, the video control signal includes a clock signal, a main-scan direction synchronization signal, a main-scan direction gate signal and a sub-scan direction gate signal.

The image reading position error measuring device according to the present invention operates as follows. An oblique line image such as the 45° oblique line image mentioned above is read and appropriately processed through the light-to-electricity converting portion 1, A-D converting portion 2 and shading correcting portion 3. The obtained image data of the oblique line image is then determined by the oblique line determining portion 4. The determined oblique line image is processed by the position error measuring portion 5, and image reading position errors such as those described above are measured based on the measurement principle described above. The obtained measurement results are output as the above-mentioned error signal.

When same-size sensors are used as the light-to-electricity converting portion in the image reading apparatus, there are no problems of light intensity reduction at the lens periphery due to lens characteristics. Therefore, the shading correcting portion 3 may be omitted. Even in such a case, the present invention can be applied.

1.3 Position Error Measuring Process

Figure 6:
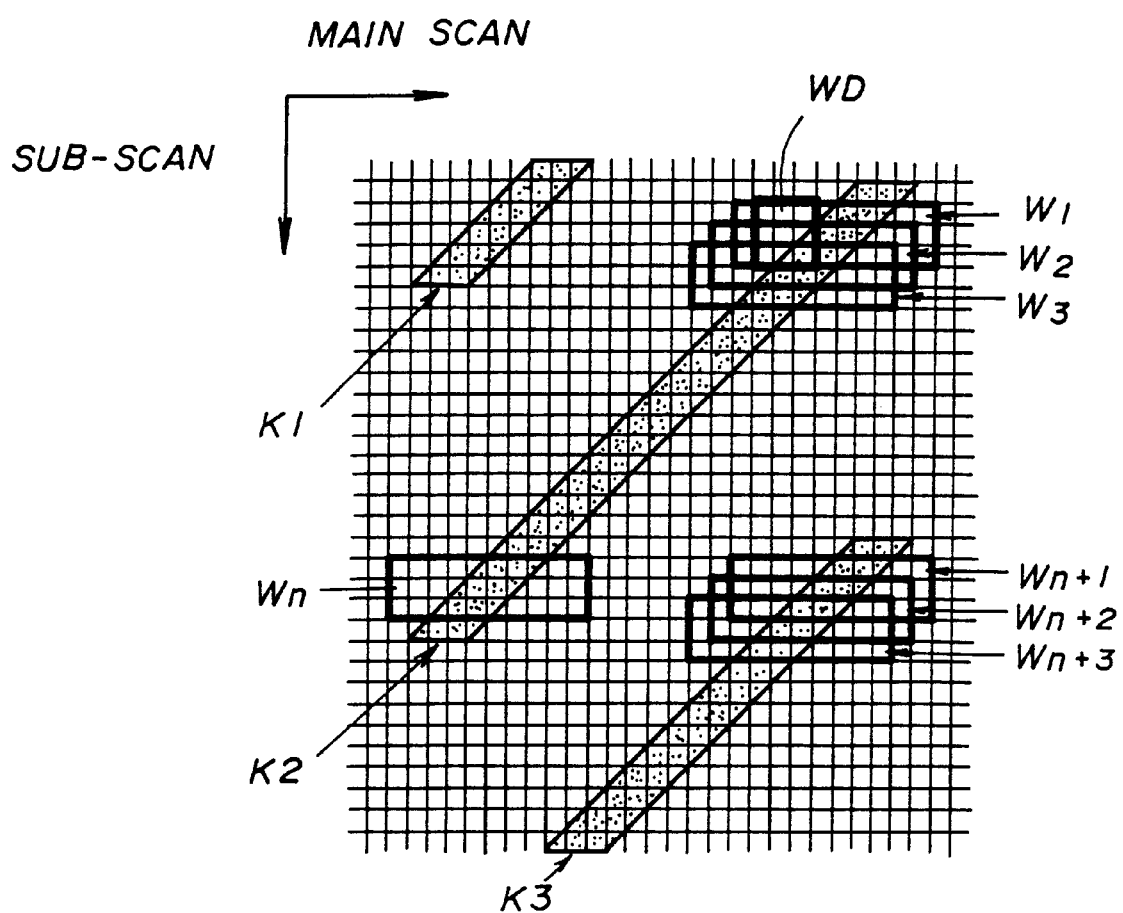
FIG. 6 illustrates movement of a center-of-gravity measuring window and a process thereof when measuring image reading position errors using a plurality of oblique line images on a bit map in the first embodiment of the present invention.

FIG. 6 illustrates a position error measuring process using an oblique line images K1, K2 and K3 in bit-map format image data which has been obtained through the light-to-electricity converting portion 1, A-D converting portion 2 and shading correcting portion 3 shown in FIG. 5. The bit-map shown in FIG. 6 is similar to the bit-map shown in FIG. 4. A center-of-gravity measuring window $W_1$ has a size of 11 pixels by 3 pixels as shown in FIG. 6. A position of a portion of the oblique line image K2 within the center-of-gravity measuring window $W_1$ in the main scan direction with respect to the center-of-gravity measuring window $W_1$ is obtained. For this purpose, the center of gravity of the image data of the pixels defined by the center-of-gravity measuring window $W_1$ in the main scan direction is calculated as will be described later. The calculated center of gravity in the main scan direction may indicate the center of the portion of the oblique line image K1 defined by the center-of-gravity measuring window $W_1$. This center-of-gravity calculation is performed repeatedly after the position of the center-of-gravity measuring window $W_1$ is moved to the position $W_2$, the position $W_3$, . . . , as shown in the figure, respectively. As shown in FIG. 6, the center-of-gravity measuring window moves in a direction which is 45° from the main scan direction 101 and also 45° from the sub-scan direction 102 in the condition where each pixel has a square shape, because the center-of-gravity measuring window moves one pixel by one pixel in the main scan direction, and simultaneously, one pixel by one pixel in the sub-scan direction. Therefore, the position of the center of gravity of the image data in the center-of-gravity measuring window in the main scan direction shifts one pixel by one pixel in the main scan direction as the center-of-gravity measuring window moves as mentioned above unless the positions of pixels of the line image K1 shifts due to undesirable causes. If the center of gravity of the pixels in the center-of-gravity measuring window does not shift one pixel by one pixel in the main scan direction as the center-of-gravity measuring window moves one pixel by one pixel in each of the main scan direction and sub-scan direction simultaneously, there would be an undesirable reason for the failure of the center of gravity to properly shift. Such a difference is an image reading position error which should be measured in the image reading position error measuring process according to the present invention. In other words, by determining whether or not the center of gravity of the pixels in the center-of-gravity measuring window shifts one pixel by one pixel in the main scan direction as the center-of-gravity measuring window moves one pixel by one pixel in each of the main scan direction and sub-scan direction simultaneously, it can be determined whether the oblique line image formed in the bit-map from the read image data is such as the oblique line image 'a' shown in FIG. 4 or is such as the oblique line image 'b' shown in the figure. In the case where the oblique line image 'a' is formed from the read image data, the center of gravity of the pixels in the center-of-gravity measuring window shifts one pixel by one pixel in the main scan direction as the center-of-gravity measuring window moves one pixel by one pixel in each of the main scan direction and sub-scan direction simultaneously. Then, it can be determined that there is no image reading position error. Otherwise, it can be determined that there is some image reading position error. The degree of image reading position error is determined by how far apart the calculated center of gravity is from a reference position of the center of gravity in the case where the center of gravity of the pixels in the center-of-gravity measuring window does not shift one pixel by one pixel in the main scan direction as the center-of-gravity measuring window moves one pixel by one pixel in each of the main scan direction and sub-scan direction simultaneously. The above-mentioned reference position of the center gravity is moved one pixel in the main scan direction each time the center-of-gravity measuring window moves one pixel in the main scan direction and one pixel in the sub-scan direction simultaneously. In a case where it is determined that a main cause of image reading position errors is unevenness of the sub-scan direction scanning speed, it is easy to appropriately convert the data of the image reading position error into data of a sub-scan direction scanning speed error. Thereby, it is possible to correct the sub-scan direction scanning speed error.

When the center of gravity of the image data in the center-of-gravity measuring window is calculated, image data of many pixels including pixels surrounding the oblique line image K1 is also used. That image data may include various types of noise such as noise inherent in the CCD and so forth. The center of the portion of the oblique line image K1 is obtained by calculating the center of gravity of the image data in the center-of-gravity measuring window according to the present invention as mentioned above. By this method, in the process of calculating the center of gravity of the image data in the center-of-gravity measuring window, the effect of such noise can be reduced, because the image data of many pixels including pixels surrounding the oblique line image is used, and the noise generally appear at random throughout the entire area of the center-of-gravity measuring window, and may be canceled out by each other. Thus, the center of the portion of the oblique line image K1 can be obtained in a high S/N (signal to noise) ratio condition. Ordinarily, when the number of pixels defined by the center-of-gravity measuring window is increased, the S/N ratio is higher.

It is preferable that the center-of-gravity measuring window is larger in the main direction because the image data in the center-of-gravity measuring window is used for calculating the center of gravity of the image data in the center-of-gravity measuring window in the main scan direction. It is possible to perform the image reading position error measurement using a center-of-gravity measuring window having a length in the sub-scan direction of one pixel. Thereby, the time required for the measurement can be reduced. The center-of-gravity measuring window is moved to $W_2$, $W_3$, . . . , respectively. The number of measuring operations to be performed is previously determined to be n for each oblique line image. Then, when i=n, that is, the center-of-gravity measuring window reaches $W_n$, the center-of-gravity measuring window is moved to $W_{n+1}$ of the subsequent oblique line image K3. At this time, the center-of-gravity measuring window is shifted by a certain number pixels in the main scan direction, where the certain number of pixels is smaller, by an integer m of pixels, than the number of pixels corresponding to the interval between the adjacent oblique lines. (In an oblique line determining operation, as described below, oblique line searching is performed in the main scan direction. Accordingly, as a result shifting the center-of-gravity measuring window by a certain number pixels in the main scan direction, where the certain number of pixels is smaller, by an integer m, than the number of pixels corresponding to the interval between the adjacent oblique lines, even if there is some reading image position error, it can be possible to prevent a situation that the adjacent oblique line cannot be found in the oblique line determining operation.) Then, the count value i is returned to 0 and the process of oblique line determining portion 4 (which will be described later as the oblique line determining operation) starts. The difference between the value of the center of gravity mom2 of the center-of-gravity measuring window $W_{n+1}$ and the value of the center of gravity mom2 of the center-of-gravity measuring window $W_n$:

$$mom = mom2 - mom1$$

is the error of the center of gravity due to change of the oblique line for which the image reading position error measurement is performed. Similarly, the center-of-gravity measuring window is shifted from $W_{n+1}$, to $W_{n+2}$, $W_{n+3}$, . . ., respectively. Thus, image reading position error measurement is performed.

By using a plurality of parallel oblique line images such as those shown in FIG. 6 in the image reading position error measurement according to the present invention, it is possible to perform the measurement throughout an original image reading area of the image reading apparatus even if the original image reading area is longer in the sub-scan direction and shorter in the main scan direction. Further, by using the plurality of parallel oblique line images in the measurement, it is possible to use in the measurement the measuring chart or pattern which is longer in the sub-scan direction and shorter in the main scan direction. By positioning such a long and narrow measuring chart along the sub-scan direction at various different positions in the main scan direction, it is possible to perform the image reading position error measurement for various positions separately.

1.4 Oblique Line Determination Operation

An oblique line determination operation performed by the oblique line determining portion 4 shown in FIG. 5 will now be described.

Figures 7, 8:
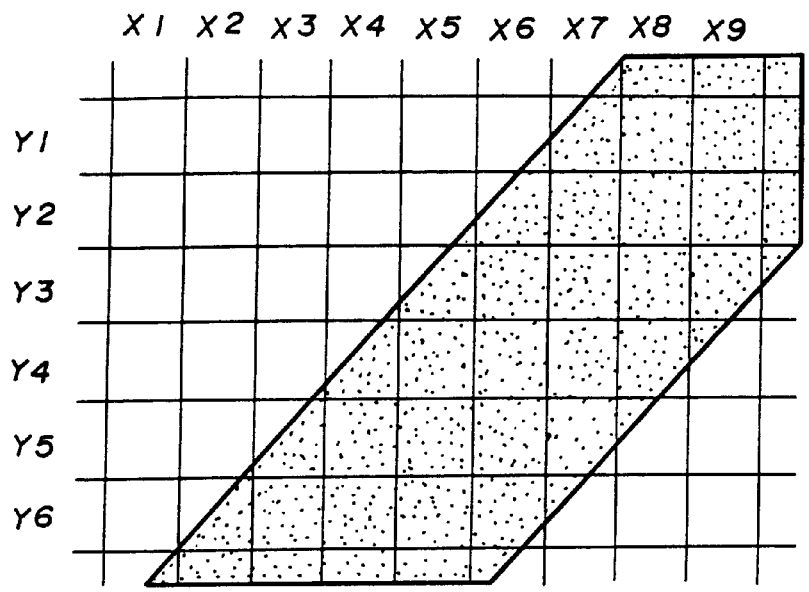
FIG. 7 shows a magnified oblique line image.
FIG. 8 shows read image data values of the oblique line image shown in FIG. 7.
Figure 11D:
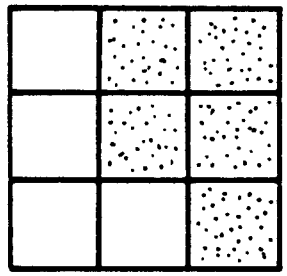
FIGS. 11A, 11B, 11C and 11D shows matching patterns for the pattern matching for determining oblique line images.
Figure 11C:
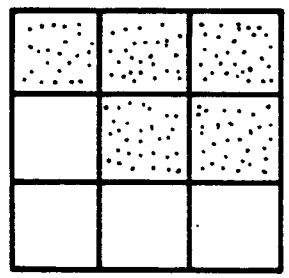
Figure 11B:
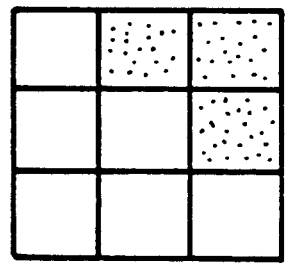
Figure 11A:
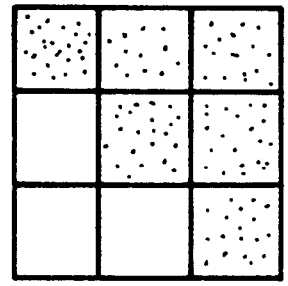

FIG. 7 shows a bit-map formation of image data representing a middle portion of an oblique line image of a measuring pattern, similar to the oblique line K2, for example, shown in FIG. 6, which image data is obtained from reading the oblique line image. FIG. 8 shows specific image data values of respective pixels of the image data shown in FIG. 7. Each of the image data values is expressed by 8-bit digital data (0 to 255) where white is expressed by '0' and black is expressed by '255'. In the bit-map formation shown in FIGS. 7 and 8, main scan direction coordinate values are represented by Xn and sub-scan direction coordinate values are represented by Yn. In the oblique line determination operation, a oblique-line determining window is used. This oblique-line determining window is of 3 pixels (main scan direction) by 3 pixels (sub-scan direction). Each of FIGS. 9A, 9B, 9C, 9D and 9E shows a pixel group, defined by the oblique-line determining window, of the image data show in FIG. 8. The pixel groups shown in FIGS. 9A, 9B, 9C, 9D and 9E are obtained by shifting the oblique-line determining window by one pixel in the main scan direction on the bit-map formation of image data shown in FIG. 8.

In this operation, first, for the pixel group (X2–X4, Y1–Y3) defined by the oblique-line determining window shown in FIG. 9A, a total of image data values of three pixels located at the top-left corner excluding the central pixel is calculated as Pa, and a total of image data values of three pixels located at the bottom-right corner excluding the central pixel is calculated as Qa. Thus, $$Pa = (X2, Y1) + (X3, Y1) + (X2, Y2)$$
$$= 3 + 1 + 1 = 5; \text{ and}$$
$$Qa = (X4, Y2) + (X3, Y3) + (X4, Y3)$$
$$= 3 + 4 + 8 = 15.$$

Similarly, for the other four pixel groups shown in FIGS. 9B, 9C, 9D and 9E, totals of pixel values of corner pixels are obtained, respectively, as follows:

$$Pb = (X3, Y1) + (X4, Y1) + (X3, Y2)$$
$$= 1 + 4 + 2 = 7; \text{ and}$$
$$Qb = (X5, Y2) + (X4, Y3) + (X5, Y3)$$
$$= 13 + 8 + 201 = 222.$$

-continued $$Pc = (X4, Y1) + (X5, Y1) + (X4, Y2)$$
$$= 4 + 2 + 3 = 9;\text{ and}$$
$$Qc = (X6, Y2) + (X5, Y3) + (X6, Y3)$$
$$= 216 + 201 + 250 = 667.$$

$$Pd = (X5, Y1) + (X6, Y1) + (X5, Y2)$$
$$= 2 + 18 + 13 = 33;\text{ and}$$
$$Qd = (X7, Y2) + (X6, Y3) + (X7, Y3)$$
$$= 248 + 250 + 252 = 750.$$

$$Pe = (X6, Y1) + (X7, Y1) + (X6, Y2)$$
$$= 18 + 220 + 216 = 454;\text{ and}$$
$$Qe = (X8, Y2) + (X7, Y3) + (X8, Y3)$$
$$= 250 + 252 + 252 = 754.$$

Then, a difference R (Ra, Rb, Rc, Rd, Re) between the total for the bottom-right corner pixels and the total for the top-left corner pixels is calculated for each pixel group, as follows:

$$Ra=Qa-Pa=15-5=10;$$

$$Rb=Qb-Pb=222-7=215;$$

$$Rc=Qc-Pc=667-9=658;$$

$$Rd=Qd-Pd=750-33=717;\text{ and}$$

$$Re=Qe-Pe=754-454=300.$$

When such a difference R (Ra, Rb, Rc, Rd, Re) has a larger value, it is determined that the oblique-line determining window comes to or starts to include pixels of an oblique line image. Thereby, it is determined that the oblique-line determining window includes pixels of such an oblique line image. For example, if a value '500' is determined as a threshold value, it is determined that the oblique-line determining window includes pixels of an oblique line image when the difference R is more than 500. According to this determination threshold value, in the case of each of the pixel groups shown in FIGS. 9C and 9D, it is determined that the oblique-line determining window includes pixels of an oblique line image.

With reference to FIGS. 10A, 10B, 10C, 10D and 10E, another example of the method of the oblique line determination operation will now be described. The pixel values shown in FIGS. 10A, 10B, 10C, 10D and 10E are obtained as a result of converting the pixel values shown in FIGS. 9A, 9B, 9C, 9D and 9E into bilevel values ('0' or '1') with a conversion threshold value of '128'. Using the pixel values shown in FIGS. 10A, 10B, 10C, 10D and 10E, the above-mentioned calculation of a total of the top-left corner pixels (Pa, Pb, Pc, Pd, Pe) and a total of the bottom-right corner pixels (Qa, Qb, Qc, Qd, Qe) is performed for each pixel group, as follows:

$$Pa = (X2, Y1) + (X3, Y1) + (X2, Y2)$$
$$= 0 + 0 + 0 = 0;\text{ and}$$

$$Qa = (X4, Y2) + (X3, Y3) + (X4, Y3)$$
$$= 0 + 0 + 0 = 0.$$

-continued $$Pb = (X3, Y1) + (X4, Y1) + (X3, Y2)$$
$$= 0 + 0 + 0 = 0;\text{ and}$$
$$Qb = (X5, Y2) + (X4, Y3) + (X5, Y3)$$
$$= 0 + 0 + 1 = 1.$$

$$Pc = (X4, Y1) + (X5, Y1) + (X4, Y2)$$
$$= 0 + 0 + 0 = 0;\text{ and}$$
$$Qc = (X6, Y2) + (X5, Y3) + (X6, Y3)$$
$$= 1 + 1 + 1 = 3.$$

$$Pd = (X5, Y1) + (X6, Y1) + (X5, Y2)$$
$$= 0 + 0 + 0 = 0;\text{ and}$$
$$Qd = (X7, Y2) + (X6, Y3) + (X7, Y3)$$
$$= 1 + 1 + 1 = 3.$$

$$Pe = (X6, Y1) + (X7, Y1) + (X6, Y2)$$
$$= 0 + 1 + 1 = 2;\text{ and}$$
$$Qe = (X8, Y2) + (X7, Y3) + (X8, Y3)$$
$$= 1 + 1 + 1 = 3.$$

Then, similarly, a difference R (Ra, Rb, Rc, Rd, Re) between the total for the bottom-right corner pixels and the total for the top-left corner pixels is calculated for each pixel group, as follows:

$$Ra=Qa-Pa=0-0=0;$$

$$Rb=Qb-Pb=1-0=1;$$

$$Rc=Qc-Pc=3-0=3;$$

$$Rd=Qd-Pd=3-0=3;\text{ and}$$

$$Re=Qe-Pe=3-2=1.$$

Similarly, when such a difference R (Ra, Rb, Rc, Rd, Re) has a larger value, it is determined that the oblique-line determining window includes pixels of an oblique line image. In this case, for example, if a value '2' is determined as a threshold value, it is determined that the oblique-line determining window includes pixels of an oblique line image when the difference R is more than 2. According to this determination threshold value, in the case of each of the pixel groups shown in FIGS. 10C and 10D, it is determined that the oblique-line determining window includes pixels of an oblique line image. In this method, because each pixel value is converted into a bilevel value as mentioned above, the calculations can thus be simplified.

With reference to FIGS. 11A, 11B, 11C and 11D, another example of the method of the oblique line determination operation will now be described. In this method, pattern matching is used. In each of FIGS. 11A, 11B, 11C and 11D, each blank square represents a '0' pixel while each dotted square represents a '1' pixel. In this method, first, image data of a pixel group defined by the oblique-line determining window is converted into bilevel image data values, as shown in FIGS. 10A, 10B, 10C, 10D and 10E. Then, the thus-obtained image data of each pixel group is compared with each matching pattern of those shown in FIGS. 11A, 11B, 11C and 11D. Then, when the image data of a pixel group defined by the oblique-line determining window is coincident with any of those matching patterns, it is determined that the oblique-line determining window includes pixels of an oblique line image. In this example, the image data of the pixel groups shown in FIGS. 10C and 10D are coincident with the matching patterns shown in FIGS. 11B and 11A, respectively. Thereby, in the case of each of the pixel groups shown in FIGS. 10C and 10D, it is determined that the oblique-line determining window includes pixels of an oblique line image.

In this embodiment, the oblique-line determining window has the size of 3 pixels by 3 pixels. However, it is possible to use another size of the oblique-line determining window. Also in the case of using another size of the oblique-line determining window, similar methods can be applied for performing the oblique line determination operation. Generally speaking, as the size of the oblique-line determining window is increased, the determination accuracy becomes higher. However, the time required for the determination operation is increased, and a circuit scale required for the determination operation is increased.

Further, in the above descriptions, only the cases where the oblique-line determining window includes pixels of the left side of an oblique line image are included. However, those methods can also be applied to cases where the oblique-line determining window includes pixels of the right side of an oblique line image. In those cases, top-left pixels have larger tone values and bottom-right pixels have smaller tone values, although the top-left pixels have smaller tone values and the bottom-right pixels have larger tone values in the above-described case of FIGS. 9C, 9D, 9C, 9D and 9E. Similarly, for the cases of the oblique-line determining window including pixels of the right side of an oblique line image, matching patterns, which are obtained by inverting the dotted pixels and blank pixels of the matching patterns shown in FIGS. 11A, 11B, 11C and 11D, may be used. Further, it is also possible to move the oblique-line determining window in the reverse direction of the main scan direction, that is, to move the oblique-line determining window leftwardly in FIG. 8, and thus to reach the condition that the oblique-line determining window includes pixels of the right side of an oblique line image and then the condition that the oblique-line determining window includes pixels of the left side of an oblique line image.

Figure 12:
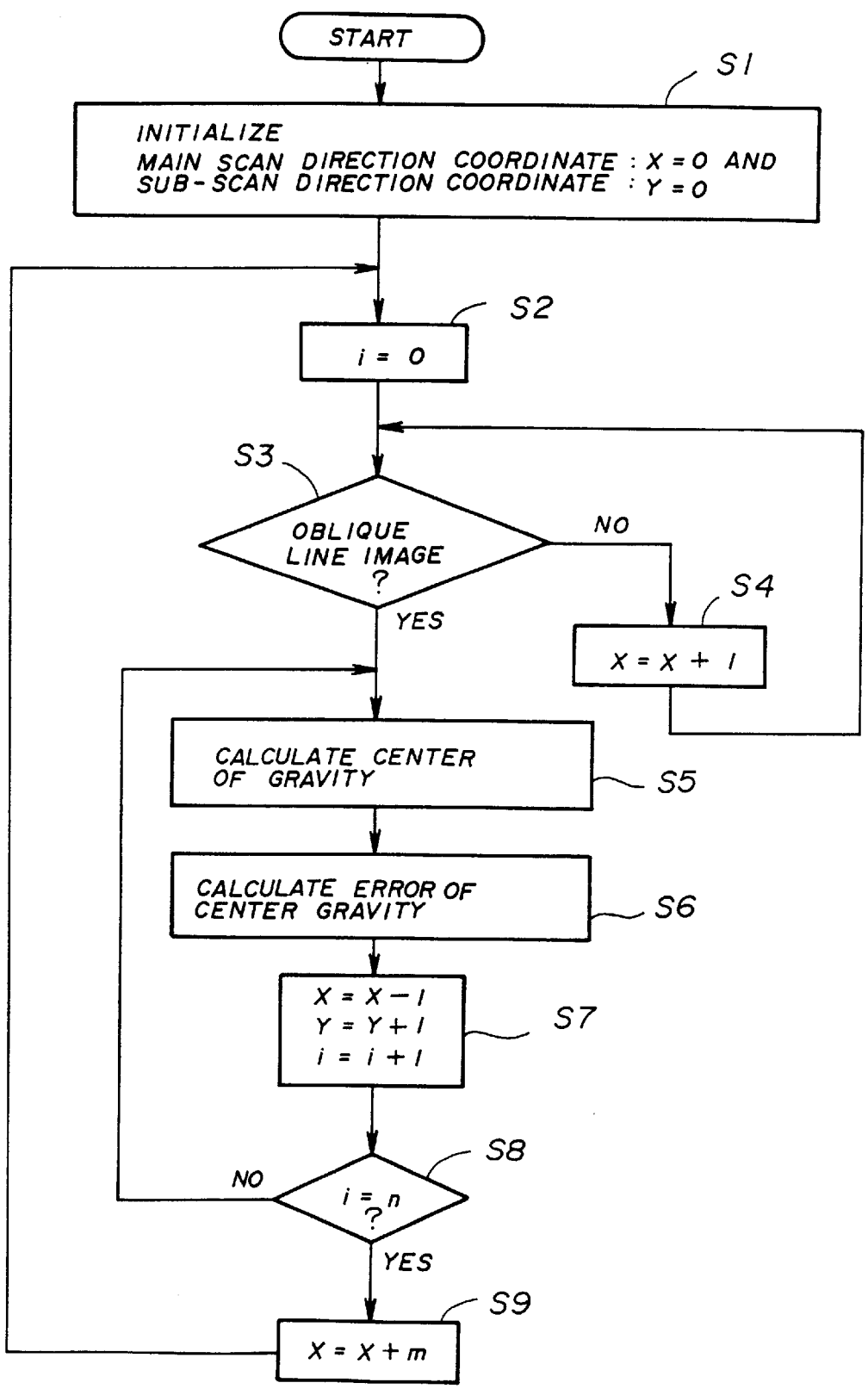
FIG. 12 shows a flowchart of a process sequence of a center of gravity measuring process of a position error measuring portion shown in FIG. 5.

1.5. Data of Measuring Window and Calculation of Center of Gravity 1.5.1 Center of Gravity Measuring Process A center of gravity measuring process will now be described. The processes shown in FIG. 12 start at the same time when scanning of an original image object (such as a sheet) is started. Each of X and Y coordinate values is initialized so that X=0 and Y=0, in S1. The X, Y coordinate values represent a pixel position, which pixel is included in the above-mentioned oblique-line determining window which is thus set in a bit-map formation of obtained image data. For example, the X, Y coordinate values represent a position of the center pixel of the oblique-line determining window of 3 pixels by 3 pixels. Then, a variant 'i' which indicates a number of measuring operations which have been performed on one oblique line image is initialized to be '0', in S2.

Then, in S3, the oblique line determining portion 4 shown in FIG. 5 determines (in the method described above in the item 4 with reference to FIGS. 7 to 11D) whether or not the set oblique-line determining window (of a size of 3 pixels by 3 pixels) includes pixels of an oblique line image. If it is determined that the oblique-line determining window does not include pixels of an oblique line image, the X coordinate value is incremented by one and, thereby, the oblique-line determining window is shifted by one pixel in the main scan direction in the bit-map formation of the image data, in S4.

This amount of shifting of the oblique-line determining window does not need to be limited to one pixel. The amount of shifting of the oblique-line determining window may be determined depending on a size of the oblique-line determining window and a thickness of each oblique line image. It is possible that the amount of shifting of the oblique-line determining window may correspond to a plurality of pixels instead of one pixel. If it is determined in S3 that the oblique-line determining window includes pixels of an oblique line image, the center-of-gravity measuring window $W_1$ (such as that shown in FIG. 6) is set in the bit-map formation of the image data, and the center of gravity of the image data of pixels defined by the center-of-gravity measuring window $W_1$ is calculated, in S5. A setting position of the center-of-gravity measuring window $W_1$ is determined so as to have a predetermined spatial relationship with the position of the oblique-line determining window. For example, the spatial relationship between the center-of-gravity measuring window $W_1$ and oblique-line determining window WD is such as that shown in FIG. 6. When the center of gravity is calculated, the position of the center-of-gravity measuring window $W_1$ may be shifted in the main scan direction or the opposite direction by an integer of pixels so that a portion the oblique line image within the center-of-gravity measuring window W1 may be positioned at the center of the center-of-gravity measuring window $W_1$.

After the center of gravity is calculated in S5, an error of the center of gravity is calculated in comparison to the case where the oblique line image is read by the image reading apparatus without any reading error, in S6. Then, the X coordinate value is decremented by one pixel (−1), the Y coordinate value is incremented by one pixel (+1) and the variant 'i' which indicates a number of measuring operations which have been performed on that oblique line is incremented by 1, in S7. Thereby, the position of the center-of-gravity measuring window is shifted into the position $W_2$ shown in FIG. 6 as a result of shifting in the sub-scan direction by one pixel and shifting in the direction opposite to the main scan direction by one pixel. The shifting amount does not need to be limited to one pixel in the sub-scan direction and the direction opposite to the main scan direction. In the above-described examples, the center-of-gravity measuring window is moved one pixel by one pixel. However, in a case where a frequency band of reasons for image reading position errors such as apparatus vibration is low, for example, it is possible that the center-of-gravity measuring window is moved two (or more) pixels by two (or more) pixels in each of the main scan direction and sub-scan direction simultaneously. Thereby, it is possible to shorten the time required for the image reading position error measuring process.

Before the above-mentioned variant 'i' reaches a predetermined number 'n', the operation returns to S5 from S8. After the variant 'i' reaches a predetermined number 'n', that is, after the center-of-gravity measuring window is positioned at the position $W_n$ shown in FIG. 6, the operation goes from S8 to S9, and thus the center-of-gravity measuring window is shifted into the position Wn+1 for the subsequent oblique line K3, in S9. For this purpose, the coordinates of the center-of-gravity measuring window are shifted in the main scan direction by a certain number of pixels, which is smaller by an integer m of pixels, than the number of pixels corresponding to the distance between the adjacent oblique line images. Then, the above-mentioned variant 'i' is initialized at '0', in S2. Then, the operation again starts from the oblique line determining operation in S3 for the oblique line image K3. Thus, the center-of-gravity measuring window is shifted into positions $W_{n+1}$, $W_{n+2}$, $W_{n+3}$, ..., respectively, and the image reading position error measurement (that is, the center of gravity error measurement) is performed for each center-of-gravity measuring window position.

By using a plurality of parallel oblique line images such as those shown in FIG. 6 in the image reading position error measurement according to the present invention, it is possible to perform the measurement throughout an original image reading area of the image reading apparatus even if the original image reading area is longer in the sub-scan direction and shorter in the main scan direction. Further, by using the plurality of parallel oblique line images in the measurement, it is possible to use in the measurement the measuring chart or pattern which is longer in the sub-scan direction and shorter in the main scan direction. By positioning such a long and narrow measuring chart along the sub-scan direction at various different positions in the main scan direction, it is possible to perform the reading pixel position error measurement for various positions separately.

In the above-described measuring method, it is not necessary to make those oblique line images of the measuring chart finer in order to improve the resolution of the reading pixel position error measurement. Thus, it is possible to use those oblique line images, each of which is wide, such that those line images may not be adversely affected by the MTF of the apparatus. By thus using the wide line pattern, the center-of-gravity measuring window should be enlarged. Thereby, it is possible to improve accuracy of the image reading position error measurement. In a case where the measurement is performed in a real-time manner, the width of each line of the oblique line image may be determined in consideration of balance between the data processing rate, the data storage size of buffers, and the circuit scale of the measurement system.

In the above-described examples, the center of an oblique line image is obtained by calculating the center of gravity of the pixels in the center-of-gravity measuring window. However, it is also possible to use a wider line image and the position of an edge of the line image is obtained in some well-known manner. Also in such a method, the reading pixel position error measurement can be performed in a similar manner.

Further, in the above-described methods using one or a plurality of parallel oblique line images, the state of the portion of the oblique line image defined by the center-of-gravity measuring window is always approximately fixed as shown in FIG. 6. Thereby, the above-mentioned 'Moire' effect problem, which cannot be avoided in the method, using the test chart of the even-pitch lines arranged in the sub-scan direction, used in the related art described above, can be avoided in the present invention. Thus, it is possible to perform a highly accurate reading pixel position error measurement.

1.5.2 Data of Window and Calculation of Center of Gravity

Figures 13, 14:
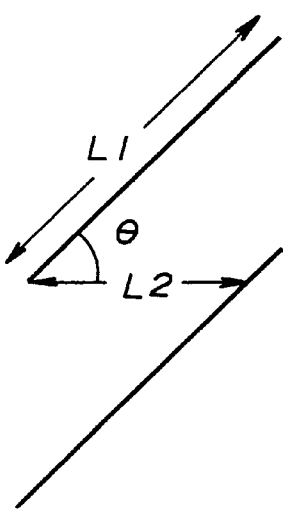
FIG. 13 shows read image data values in the center-of-gravity-measuring window and illustrates a center-of-gravity measuring method.
FIG. 14 illustrates lengths and angles of oblique lines.

Data of center-of-gravity measuring window and calculation of the center of gravity will now be described in detail. FIG. 13 shows image data of pixels defined by a center-of-gravity measuring window. When calculating the center of gravity of the pixels in the center-of-gravity measuring window, the total of the image data of the pixels is obtained for each column, for those three main scan lines. The totals of the image data of the pixels obtained for those columns, which columns are referred to as, from the left-hand side, X0, X1, X2, X3, X4, X5, X6, X7, X8, and X9, as shown in FIG. 13, respectively. Those totals are 18, 50, 202, 427, 590, 562, 345, 150, 37, and 14, respectively, as shown in the figure. Assuming that the main scan direction coordinate values of the centers of those pixels are, toward the right-hand side, 0 to 9, respectively, $$Z0(Rm-0)+Z1(Rm-1)+Z2(Rm-2)+ \ldots +Z9(Rm-9)=0 \quad (6),$$

where the coordinate value of the center of gravity in the main scan direction is 'Rm', because the overall moment about the center of gravity 'Rm' is 0. Thus, the center of gravity in the main scan direction of (the image data of) the pixels in the center-of-gravity measuring window is calculated. After applying the above-mentioned specific values of the image data column totals X0, X1, X2, ..., X9 and solving the above-mentioned equation (6), the center of gravity:

Rm=4.362.

is obtained.

1.5.3 Calculation of Center of Gravity for a Plurality of Oblique Line Images

In a case where the image reading position error measurement is performed using a plurality of oblique line images such as that shown in FIG. 6, an operation which will be described is performed. A case will now be considered where the center-of-gravity measuring window is shifted from an oblique line image to a subsequent oblique line image, such that the center-of-gravity measuring window is shifted from the position $W_n$ to the position $W_{n+1}$ shown in FIG. 6. In this case, it is assumed that the center-to-center distance in the main scan direction between the adjacent oblique lines does not correspond to an integer number of pixels. In comparison therewith, the center-of-gravity measuring window is shifted by an integer number of pixels. In such a case, it is necessary to correct an obtained image reading position error for a deviation of that center-to-center distance in the main scan direction between the adjacent oblique lines from an integer number of pixels, that is, a fraction portion of that distance. Thereby, it is possible to obtain the image reading position error without including an error due to such a fraction portion of that distance. For example, in the example shown in FIG. 6, it is assumed that the center of gravity of image data of pixels defined by the center-of-gravity measuring window W of the oblique line image K2 is '4.65', that is, $R_n$=4.65. Further, the center of gravity of the center-of-gravity measuring window $W_{n+1}$ of the oblique line K3 is '4.38', that is, $R_{n+1}$=4.38. Similarly, the center of gravity of the center-of-gravity measuring window $W_{n+2}$ is $R_{n+2}$=4.40, and the center of gravity of the center-of-gravity measuring window $W_{n+3}$ is $R_{n+3}$=4.41. In this case, the difference mom of the centers of gravity due to shifting of the center-of-gravity measuring window between the adjacent oblique line images is obtained as follows:

$$mom=R_{n+1}-Rn=4.38-4.65=-0.27$$

This value mom is subtracted from each of the values of the centers of gravity for the oblique line image K3, and thus, the subtraction results are considered as the values of centers of gravity. Then, using these values, the image reading position error is obtained. The value $R_{n+2}$ of the center-of-gravity measuring window $W_{n+2}$ and the value $R_{n+3}$ of the center-of-gravity measuring window $W_{n+3}$ are obtained as follows:

$$R_{n+2}=R_{n+2}-mom=4.40+0.27=4.67; \text{ and}$$

$$R_{n+3}=R_{n+3}-mom=4.41+0.27=4.68.$$

Thereby, when a plurality of oblique line images are used for the image reading position error measurement, it is possible to perform the measurement continuously through the plurality of oblique lines with high accuracy. In this case, it is necessary, when the center-of-gravity measuring window is shifted between the positions $W_n$ and $W_{n+1}$ of the oblique lines K2 and K3, respectively, that those oblique line images K2 and K3 are present on the same main scan line.

FIG. 14 shows a spatial relationship between adjacent oblique lines. As shown in FIG. 14, in a case where each oblique line has a length of L1, an angle between each oblique line and the main scan line direction is Θ, the following equation (7) is satisfied:

$$L2 < L1 \cdot \cos \Theta,$$

where L2 represents a distance in the main scan direction between adjacent oblique lines. Thereby, adjacent oblique lines are present on the same scan line, that is, the bottom end of the upper oblique line of the adjacent oblique lines is lower than the top end of the lower oblique line, as shown in FIG. 14. In such a condition, it is possible to continue the image reading position error measurement through a plurality of oblique lines by shifting the center-of-gravity measuring window therebetween in the main scan direction. When the difference between the left-hand term (L2) and the right-hand term (L1·cos Θ) is larger in the above-mentioned equation, accuracy in the length L1 of each oblique line does not need to be high.

1.6. Image Reading Position Error Measurement Procedure

Figure 15:
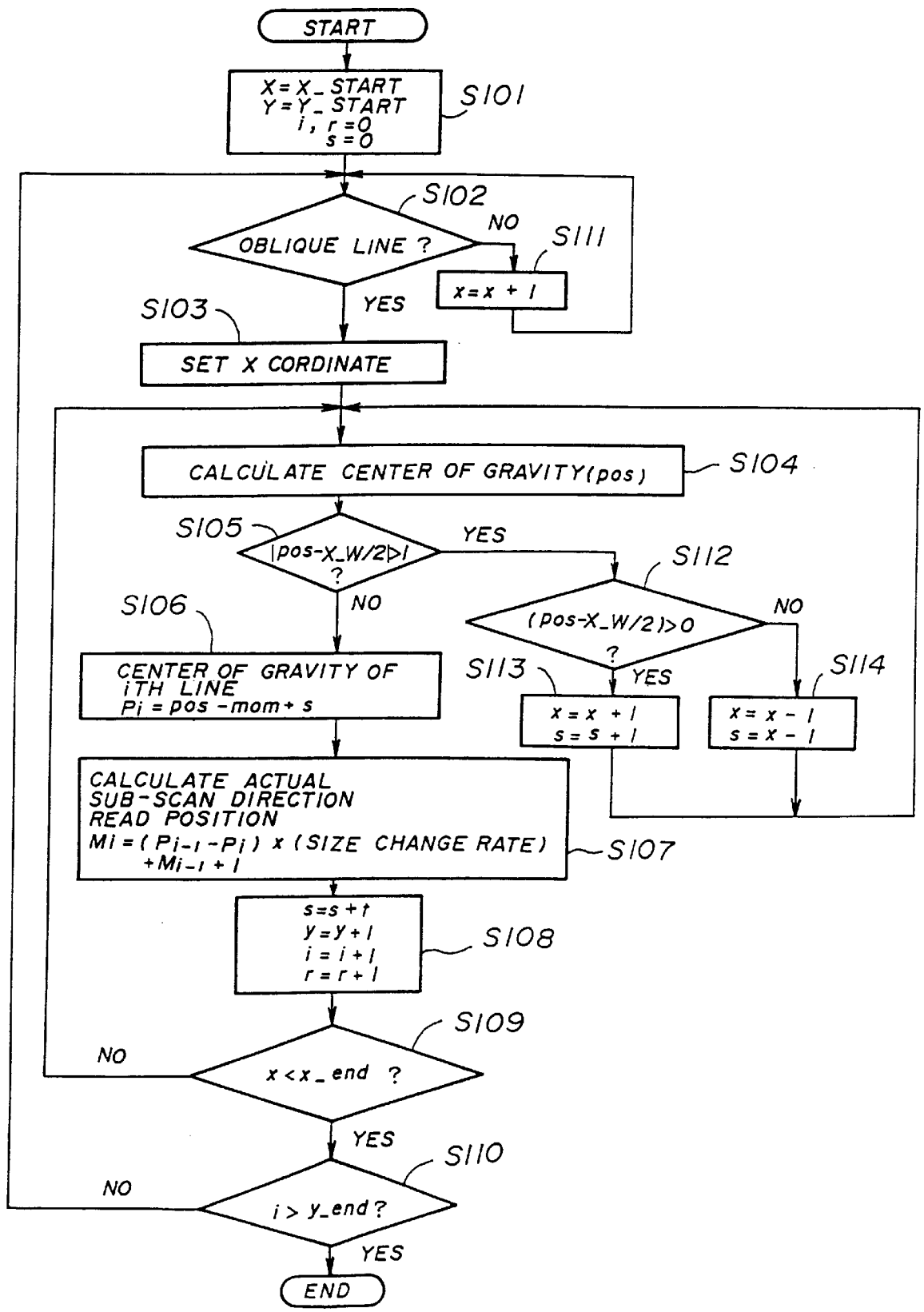
FIG. 15 shows a flowchart of a process sequence of an image reading position error (actual sub-scan direction read position) measuring process of a position error measuring portion shown in FIG. 5.

FIG. 15 shows a flowchart of a process sequence when image reading position errors are measured. The process starts at the same time when image scanning starts. In a step S101 (hereinafter, the term 'step' being omitted), an initialization process is performed. Specifically, initial coordinate values of the coordinates x, y of the main scan direction and sub-scan direction are set (X=X_START, Y=Y_START). First, these coordinates are the coordinates of a position of the oblique-line determining window. For example, the coordinates are the coordinates of the center pixel of the oblique-line determining window. Then, a variable 'r' for counting the number of times of measurement for each oblique line image and a variable 'i' for counting the number of times of measurement for the entire image (i, r=0). Further a variable 's' indicating a shift amount which is used when obtaining the value of the center of gravity for each main scan line from the value of the center of gravity in a respective center-of-gravity measuring window (s=0).

Figure 16:
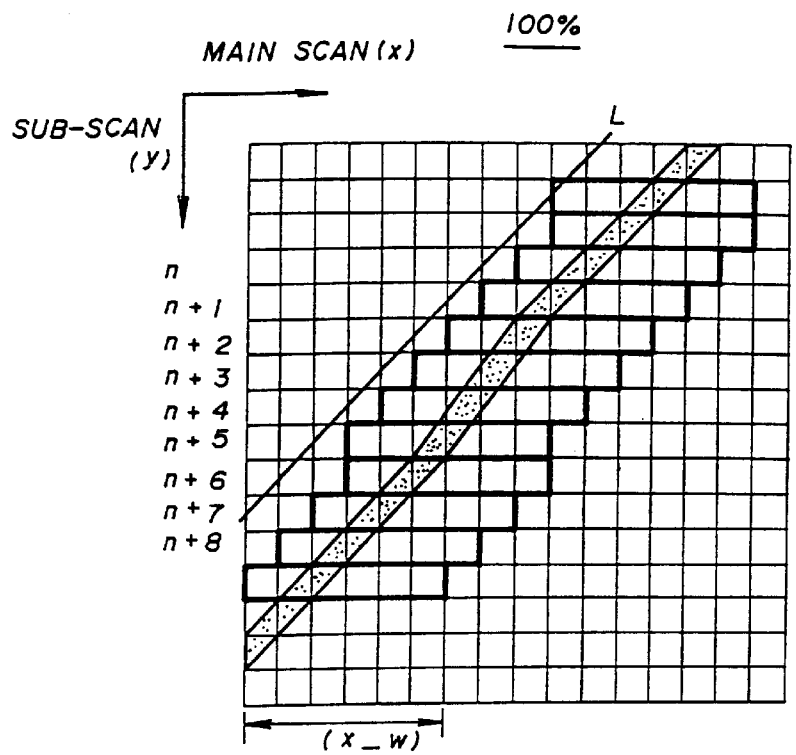
FIG. 16 illustrates a bit map pattern, when an image size change rate is 100%, of an oblique line image when image reading position errors occur.
Figure 17:
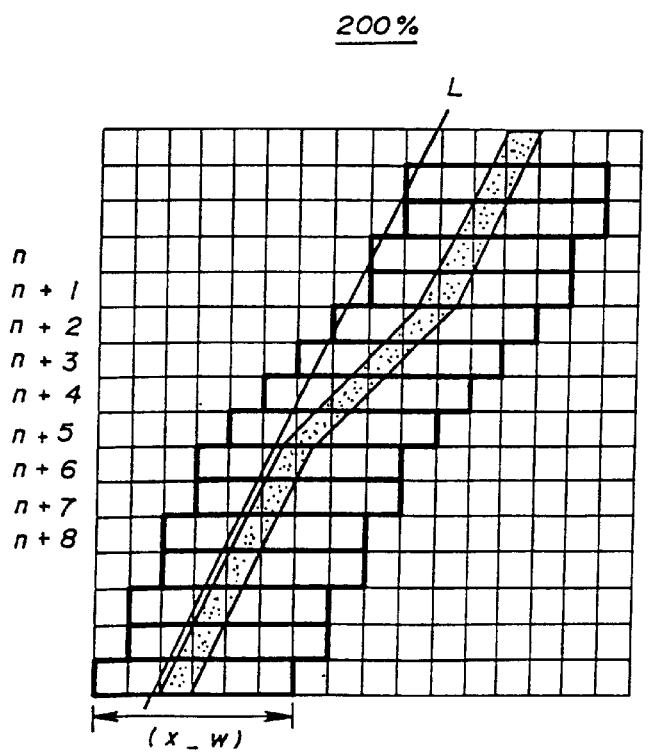
FIG. 17 illustrates a bit map pattern, when an image size change rate is 200%, of an oblique line image when image reading position errors occur.
Figure 18:
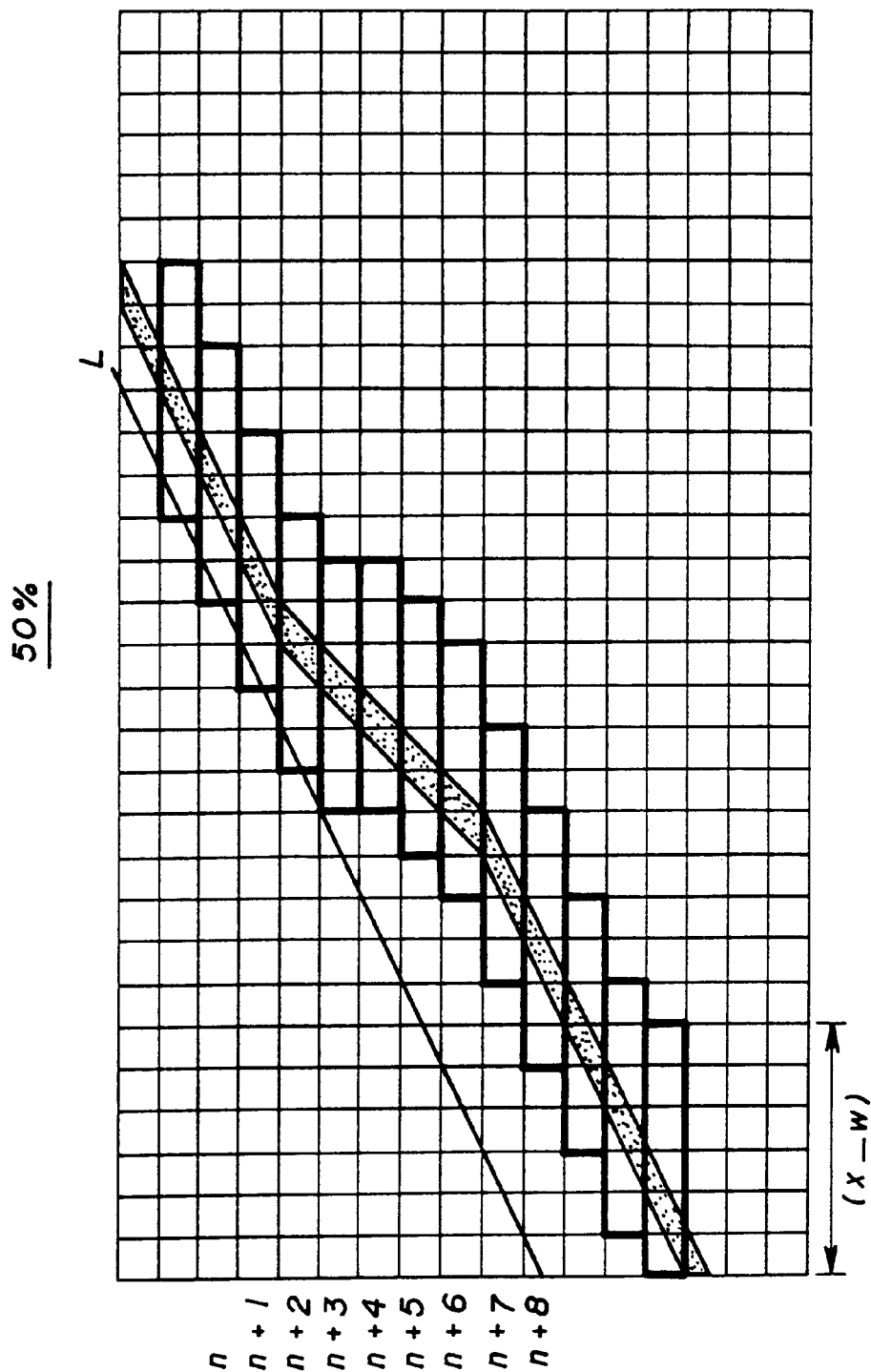
FIG. 18 illustrates a bit map pattern, when an image size change rate is 50%, of an oblique line image when image reading position errors occur.

In S102, the oblique line determination portion 4 determines whether an oblique line image is included in the oblique-line determining window. If the determining window does not include an oblique line image, the oblique-line determining window is shifted by one pixel in the main scan direction in S111. An amount by which the oblique-line determining window is shifted is predetermined depending on the size of the oblique-line determining window and the thickness of each oblique line. It is possible that the oblique-line determining window is sifted by more than one pixel. When an oblique line image is included in the oblique-line determining window, the center-of-gravity measuring window is set in S103. Specifically, the current x coordinate is shifted in the reverse direction of the main scan direction by a predetermined number of pixels. The resulting x coordinate position is the position of the leftmost pixel of the center-of-gravity measuring window. This predetermined number of pixels is determined, depending on the width of the center-of-gravity measuring window in the main scan direction and the width of the oblique line in the main scan direction, so that the center-of-gravity measuring window includes an oblique line image approximately at the center of the center-of-gravity measuring window. In S104, the center of gravity 'pos' in the thus-set center-of-gravity measuring window is obtained. In S105, the thus-obtained value of the center of gravity is compared with value X_W/2 (where X_W indicates the width of the center-of-gravity measuring window in the main scan direction as shown in FIGS. 16, 17 and 18) indicating the center of the center-of-gravity measuring window. If the result of the difference between the value of pos and the value X_W/2 is near 0, the oblique line image is positioned approximately at the center of the center-of-gravity measuring window. If the difference is more than +1, the center-of-gravity measuring window is sifted by one pixel in the main scan direction or the x coordinate of the center-of-gravity is shifted by +1 in S112 and S113. Then, '1' is added to the shift amount counting variable 's'. If the difference is less than −1, the center-of-gravity measuring window is sifted by one pixel in the reverse direction of the main scan direction or the x coordinate of the center-of-gravity is shifted by −1 in S112 and S114. Then, '1' is subtracted from the shift amount counting variable 's'.

When the absolute value of the above-mentioned difference between the value of pos and the value X_W/2 is equal to or less than 1 after these processes are appropriately repeated, S106 is performed. In this embodiment, it is necessary that the absolute value of the above-mentioned difference is less than 1. However, the threshold value of the number of the absolute value of the above-mentioned difference is not limited to '1'. The threshold value may be appropriately determined depending on the size of the center-of-gravity measuring window.

In S106, the center of gravity $P_i$ of the 'i'th main scan line is calculated. In S106, 'mom' is, as mentioned above, a coefficient for correcting a center of gravity difference occurring when the center-of-gravity measuring window is shifted from one oblique line to another oblique line as shown in FIG. 6. The center of gravity $P_i$ of the 'i'th main scan line is calculated as a result of subtracting the center of gravity difference correction value 'mom' from the center of gravity 'pos' and adding the shift amount 's' to the subtraction result.

S107, the actual sub-scan direction read position $M_i$ of the 'i'th main scan line is calculated. Specifically, the difference between the center of gravity $P_i$ of the 'i'th main scan line and the center of gravity $P_{i-1}$ of the 'i−1'th main scan line is multiplied by an image size change rate. Then, the actual sub-scan direction read position $M_{i-1}$ of the 'i−1'th main scan line and the sub-scan direction moving amount '1' are added to the multiplication result.

When there is no image reading position error, that is, when there is no image reading sub-scan direction speed change, $P_i=P_{i-1}$. In this case, the actual sub-scan direction read position $M_i$ is $M_{i-1}+1$. When there is an image reading position error, that is, when there is image reading sub-scan direction speed change, there is a difference between $P_i$ and $P_{i-1}$. When the image size change rate is '1' (100%), because the oblique line extends 45° from the main scan direction, the difference between $P_i$ and $P_{i-1}$ is equal to the image reading position error (in the sub-scan direction). Accordingly, the actual sub-scan direction read position is obtained as a result of adding the sub-scan direction moving direction '1' and the actual sub-scan direction read position $M_{i-1}$ of the 'i−1' main scan line to $(P_i-P_{i-1})$. When the image size change rate not '1' (100%), the difference between $P_i$ and $P_{i-1}$ is not equal to the image reading position error (in the sub-scan direction). For example, the image size change rate is '2' (200%), because the sub-scan direction reading speed is half, the image reading position error (in the sub-scan direction) is twice ($P_i-P_{i-1}$). Accordingly, the actual sub-scan direction read position is obtained as a result of adding the sub-scan direction moving direction '1' and the actual sub-scan direction read position $M_{i-1}$ of the 'i−1' main scan line to twice ($P_i-P_{i-1}$).

In S108, the center-of-gravity measuring window is shifted in the sub-scan direction by one pixel. The variables 'i' and 'r' for counting the number of times of measurement are incremented. Further, 't' is added to the shift amount 's'. The value of 't' depends on an image size change rate as follows:

$$t=100/(\text{image size change rate}(\%)).$$

Accordingly, when an image size change rate is 100%, t=1. When an image size change rate is 200%, t=0.5. When an image size change rate is 50%, t=2.

In this embodiment, the center-of-gravity measuring window moves in the sub-scan direction one pixel by one pixel. However, when a frequency band of vibration or the like which may cause image reading position errors is low, it is possible to move the center-of-gravity measuring window in the sub-scan direction two pixels by two pixels, for example. In S109, it is determined whether or not the oblique line image on which the measurement is performed is changed to the subsequent oblique line. If it is determined in S109 that the measurement will be continued on the current oblique line image, the operation returns to S104. Then, the measurement is performed on the subsequent main scan line. In S110, it is determined whether or not the measurement has been completed on the last oblique line image. If it is determined that the measurement has not been completed on the last oblique line image, the operation flow returns to S102. Then, the measurement is performed on the subsequent oblique line image.

1.7. Relationship between Oblique Line Image Movement in the Main Scan Direction and Actual Sub-scan Direction Reading Position In this embodiment, in order to measure an actual sub-scan direction read position, movement of an oblique line image, which is obtained as a result of reading an oblique line, in the main scan direction is measured. When measurement is performed using square pixels and 45° oblique line images, as obvious from the above description, a difference of centers of gravity in the main scan direction of an oblique line image in the center-of-gravity measuring windows between main scan lines directly indicates an image reading position error in the sub-scan direction. However, when each pixel is not a square or the angle of an oblique line is not 45°, conversion is necessary to obtain an image reading position error in the sub-scan direction. With reference to FIGS. 16, 17 and 18, a method of the conversion when the angle of an oblique line is not 45° will be described.

FIG. 16 shows a bit map pattern including an oblique line image obtained as a result of reading an oblique line when the image size change rate is 100%. FIG. 17 shows a bit map pattern including an oblique line image obtained as a result of reading an oblique line when the image size change rate is 200%. FIG. 18 shows a bit map pattern including an oblique line image obtained as a result of reading an oblique line when the image size change rate is 50%. In FIG. 16, a sub-scan direction image reading speed is slow midway through reading the oblique line. In FIG. 17, a sub-scan direction image reading speed is fast midway through reading the oblique line. In FIG. 18, a sub-scan direction image reading speed is slow midway through reading the oblique line. In each figure, a straight line L is a straight line passing through the left end of the first set center-of-gravity measuring window and in parallel with an oblique line image obtained as a result of reading an oblique line without image reading position errors.

With regard to the 'n'th main scan line of FIG. 16, assuming that the center of gravity in the center-of-gravity measuring window pos=2, the center of gravity difference correction value mom=0 and the shift amount s=1, the value of the center of gravity of the 'n'th main scan line is obtained in S106 of FIG. 15 as follows:

$$2+0+1=3.$$

Then, in the calculation of the actual sub-scan direction read position in S107, assuming that the center of gravity of the 'n−1'th main scan line $P_{n-1}=3$, the actual sub-scan direction read position of the 'n−1'th main scan line $M_{n-1}=5$, the actual sub-scan direction read position of 'n'th main scan line is obtained as follows:

$$M_n=(3-3)\cdot 1+5+1=6.$$

Then, in S108, 't' is added to the shift amount 's'. Because the image size change rate is 100%, t=1. Then, s=2. Further, '1' is added to 'y'. Thereby, the center-of-gravity measuring window moves in the y direction by one line. Then, the operation returns to S104. In S104, the center of gravity 'pos' in the center-of-gravity measuring window is obtained. In S105, it is determined whether the oblique line image is present at the center of the center-of-gravity measuring window. Assuming that pos=1, $$|1-6/2|=2>1; \text{ and}$$

$$1-6/2<0.$$

Accordingly, S114 is performed. The center-of-gravity measuring window is moved −1 in the x direction and '1' is subtracted from 's'. Accordingly, s=1. Then, the operation flow returns to S104. In S104, pos=2. In S105, $$|2-6/2|=1.$$

Accordingly, S106 is performed. In S106, $$P_{n+1}=2-0+1=3.$$

In S108, the actual sub-scan read position is obtained as follows:

$$M_{n+1}=(3-3)\cdot 1+6+1=7.$$

Then, in S108, s=2, and the center-of-gravity measuring window is moved in the y direction by one line. In S104, assuming that pos=1.2. Then, $$|1.2-6/2|=1.8>1; \text{ and}$$

$$1.2-6/2<0.$$

Accordingly, S114 is performed. In S114, the center-of-gravity measuring window is moved in the x direction by −1, '1' is subtracted from 's'. As a result, s=1. Then, S104 is performed.

Assuming that pos=2.2 in S104, in S105, $$|2.2-6/2|=0.8<1.$$

Then, S106 is performed. In S106, the center of gravity of the 'n+2'th main scan line is obtained as follows:

$P_{n+2}=2.2-0+1=3.2$.

Then, in S107, the actual sub-scan direction read position of the 'n+2'th main scan line is obtained as follows:

$M_{n+2}=(3-3.2)\cdot1+7+1=7.8$.

Then, in S108, s=2 and the center-of-gravity measuring window is moved in the y direction by 1. By continuing such measurement, the following data is obtained:

| NUMBER OF MAIN SCAN LINE | S104 pos | S105 x, s | S106 $P_i$ | S107 $M_i$ | S108 s |
|---|---|---|---|---|---|
| n | 2.0 | 10, 1 | 3.0 | 6.0 | 2.0 |
| n + 1 | 2.0 | 9, 1 | 3.0 | 7.0 | 2.0 |
| n + 2 | 2.2 | 8, 1 | 3.2 | 7.8 | 2.0 |
| n + 3 | 2.4 | 7, 1 | 3.4 | 8.6 | 2.0 |
| n + 4 | 2.6 | 6, 1 | 3.6 | 9.4 | 2.0 |
| n + 5 | 2.8 | 5, 1 | 3.8 | 10.2 | 2.0 |
| n + 6 | 2.0 | 5, 2 | 4.0 | 11.0 | 3.0 |
| n + 7 | 2.0 | 4, 2 | 4.0 | 12.0 | 3.0 |
| n + 8 | 2.0 | 3, 2 | 4.0 | 13.0 | 3.0 |

As it is seen from the above data, the center of gravity of each main scan line $P_i$ indicates a distance between the center of the oblique line image and the straight line L.

When the image size change rate is 200%, with regard to the 'n'th main scan line of FIG. 17, assuming that the center of gravity in the center-of-gravity measuring window pos=2.8, the center of gravity difference correction value mom=0 and the shift amount s=0, the value of the center of gravity of the 'n'th main scan line is obtained in S106 of FIG. 15 as follows:

$2.8+0+0=2.8$.

Then, in the calculation of the actual sub-scan direction read position in S107, assuming that the center of gravity of the 'n−1'th main scan line $P_{n-1}=2.8$, the actual sub-scan direction read position of the 'n−1'th main scan line $M_{n-1}=5$, the actual sub-scan direction read position of 'n'th main scan line is obtained as follows:

$Mn=(2.8-2.8)\cdot2+5+1=6$.

Then, in S108, 't' is added to the shift amount 's'. Because the image size change rate is 200%, t=0.5. Then, s=0.5. Further, '1' is added to 'y'. Thereby, the center-of-gravity measuring window moves in the y direction by one line. Then, the operation flow returns to S104. In S104, the center of gravity 'pos' in the center-of-gravity measuring window is obtained. In S105, it is determined whether the oblique line image is present at the center of the center-of-gravity measuring window. Assuming that pos=2.3, $|2.3-6/2|=0.7<1$ Then, S106 is performed. In S106, $P_{n+1}=2.3-0+0.5=2.8$ In S108, the actual sub-scan read position is obtained as follows:

$M_{n+1}=(2.8-2.8)\cdot2+6+1=7$.

Then, in S108, $s=0.5+0.5=1$, and the center-of-gravity measuring window is moved in the y direction by one line. In S104, assuming that pos=1.5. Then, $|1.5-6/2|=1.5>1$; and $1.5-6/2<0$.

Accordingly, S114 is performed. In S114, the center-of-gravity measuring window is moved in the x direction by −1, '1' is subtracted from 's'. As a result, s=0. Then, S104 is performed.

Assuming that pos=2.5 in S104, in S105, $|2.5-6/2|=0.5<1$.

Then, S106 is performed. In S106, the center of gravity of the 'n+2'th main scan line is obtained as follows:

$P_{n+2}=2.5-0+0=2.5$.

Then, in S107, the actual sub-scan direction read position of the 'n+2'th main scan line is obtained as follows:

$M_{n+2}=(2.8-2.5)\cdot2+7+1=8.6$.

Then, in S108, s=0.5 and the center-of-gravity measuring window is moved in the y direction by 1. By continuing such measurement, the following data is obtained:

| NUMBER OF MAIN SCAN LINE | S104 pos | S105 x, s | S106 $P_i$ | S107 $M_i$ | S108 s |
|---|---|---|---|---|---|
| n | 2.8 | 10, 0 | 2.8 | 6.0 | 0.5 |
| n + 1 | 2.3 | 10, 0.5 | 2.8 | 7.0 | 1.0 |
| n + 2 | 2.5 | 9, 0 | 2.5 | 8.6 | 0.5 |
| n + 3 | 2.5 | 8, −0.5 | 2.0 | 10.6 | 0 |
| n + 4 | 2.5 | 7, −1 | 1.5 | 12.6 | −0.5 |
| n + 5 | 2.5 | 6, −1.5 | 1.0 | 14.6 | −1.0 |
| n + 6 | 2.8 | 5, −2 | 0.8 | 16.0 | −1.5 |
| n + 7 | 2.3 | 5, −1.5 | 0.8 | 17.0 | −1.0 |
| n + 8 | 2.8 | 4, −2 | 0.8 | 18.0 | −1.5 |

When the image size change rate is 50%, with regard to the 'n'th main scan line of FIG. 18, assuming that the center of gravity in the center-of-gravity measuring window pos=2.4, the center of gravity difference correction value mom=0 and the shift amount s=0, the value of the center of gravity of the 'n'th main scan line is obtained in S106 of FIG. 15 as follows:

$2.4+0+0=2.4$.

Then, in the calculation of the actual sub-scan direction read position in S107, assuming that the center of gravity of the 'n−1'th main scan line $P_{n-1}=2.4$, the actual sub-scan direction read position of the 'n−1'th main scan line $M_{n-1}=5$, the actual sub-scan direction read position of 'n'th main scan line is obtained as follows:

$Mn=(2.4-2.4)\cdot0.5+5+1=6$.

Then, in S108, 't' is added to the shift amount 's'. Because the image size change rate is 50%, t=2. Then, s=2. Further, '1' is added to 'y'. Thereby, the center-of-gravity measuring window moves in the y direction by one line. Then, the operation flow returns to S104. In S104, the center of gravity 'pos' in the center-of-gravity measuring window is obtained. In S105, it is determined whether the oblique line image is present at the center of the center-of-gravity measuring window. Assuming that pos=0.4, $|0.4-6/2|=2.6>1$; and $0.4-6/2<1$ Accordingly, S114 is performed. In S114, the center-of-gravity measuring window is moved in the x direction by −1, '1' is subtracted from 's'. As a result, s=1. Then, S104 is performed.

Assuming that pos=1.4 in S104, in S105, $|1.4-6/2|=1.6>0$; and $1.4-6/2<0$.

Accordingly, S114 is performed again. In S114, the center-of-gravity measuring window is moved in the x direction by −1, '1' is subtracted from 's'. As a result, s=0. Then, S104 is performed again.

Assuming that pos=2.4 in S104, in S105, $|2.4-6/2|=0.6<1$.

Then, S106 is performed. Here, by controlling an amount added to/subtracted from 'x','s' in S112 and S114, depending on the value of |pos−X_W/2| (the difference between the center of gravity in the center-of-gravity measuring window and the center of the center-of-gravity measuring window), it is possible to reduce the number of cycles of S104, 105, 112, 113 and 114. Thus, the operation time can be reduced. For example, by adding '2'/subtracting '2' to and from 'x', 's' in S113 and S114 when $|pos-X_{13}\ W/2|\geq 2$, the above-described two cycles of S104, 105, 112, 113 and 114 can be reduced to one cycle. In S106, $P_{n+1}=2.4-0+0=2.4$.

In S108, the actual sub-scan read position is obtained as follows:

$M_{n+1}=(2.4-2.4)\cdot 0.5+6+1=7$.

Then, in S108, s=2, and the center-of-gravity measuring window is moved in the y direction by one line. In S104, assuming that pos=3 and s=0 after passing cycles of steps similar to the above-mentioned cycles of steps,
Then, $|3-6/2|=0<1$.

Accordingly, S106 is performed. In S106, the center of gravity of the 'n+2'th main scan line is obtained as follows:

$P_{n+2}=3-0+0=3$.

Then, in S107, the actual sub-scan direction read position of the 'n+2'th main scan line is obtained as follows:

$M_{n+2}=(2.4-3)\cdot 0.5+7+1=7.7$.

Then, in S108, s=2 and the center-of-gravity measuring window is moved in the y direction by 1. By continuing such measurement, the following data is obtained:

| NUMBER OF MAIN SCAN LINE | S104 pos | S105 x, s | S106 $P_i$ | S107 $M_i$ | S108 s |
|---|---|---|---|---|---|
| n | 2.4 | 20, 0 | 2.4 | 6.0 | 2.0 |
| n + 1 | 2.4 | 18, 0 | 2.4 | 7.0 | 2.0 |
| n + 2 | 3.0 | 16, 0 | 3.0 | 7.7 | 2.0 |
| n + 3 | 3.0 | 15, 1 | 4.0 | 8.2 | 3.0 |
| n + 4 | 2.0 | 15, 3 | 5.0 | 8.7 | 5.0 |
| n + 5 | 2.0 | 14, 4 | 6.0 | 9.2 | 6.0 |
| n + 6 | 2.0 | 13, 5 | 7.0 | 9.7 | 7.0 |
| n + 7 | 2.6 | 11, 5 | 7.6 | 10.4 | 7.0 |
| n + 8 | 2.6 | 9, 5 | 7.6 | 11.4 | 7.0 |

Thus, image reading position error measurement for cases of various image size change rates can be performed.

Figure 29:
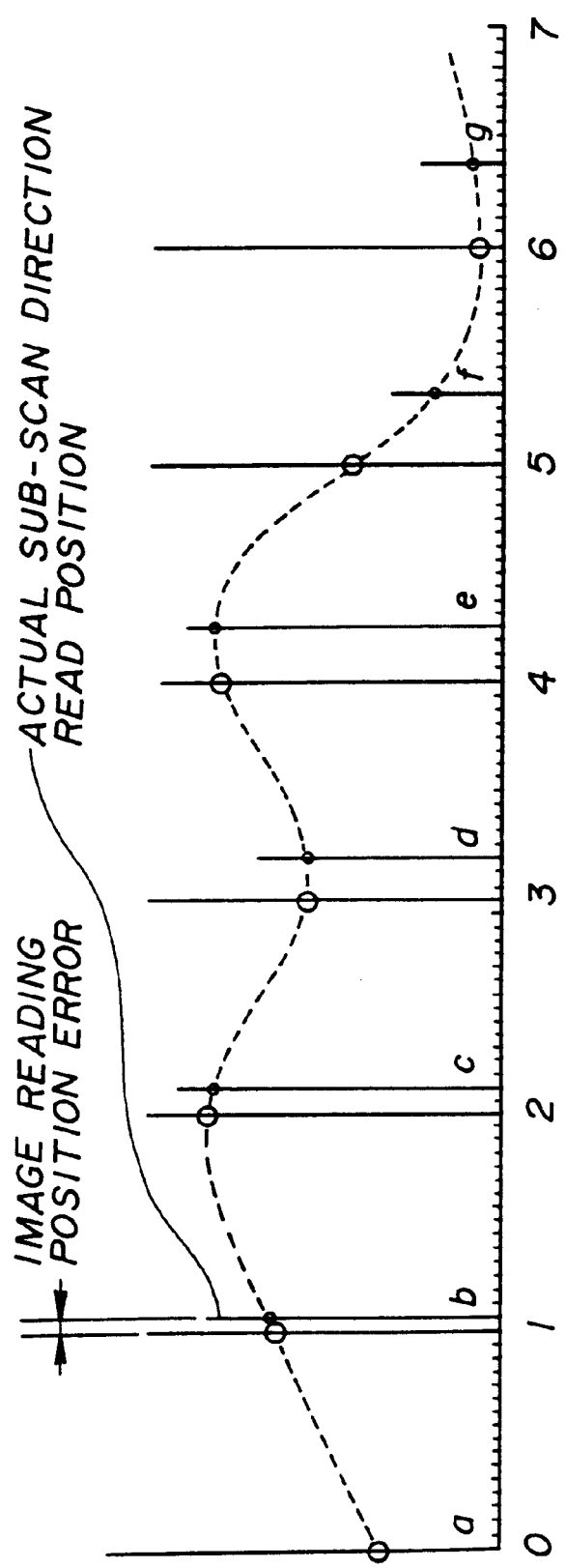
FIG. 29 illustrates image reading position error correction method in the second embodiment.

An actual sub-scan direction read position $M_i$ is obtained for each main scan line. Thus, an actual sub-scan direction read position for each main scan line of read image data can be obtained. Using the actual sub-scan direction read positions of the actual read image data, it is possible to obtain image data for correct sub-scan direction reading positions. The method for this purpose will be described later in item 2.9 with reference to FIG. 29. In the example of FIG. 29, the positions 'a', 'b', 'c', 'd', 'e', 'f' and 'g' are actual sub-scan direction read positions, respectively, and each of the difference between the positions '1' and 'b', the difference between the positions '1' and 'c', the difference between the position '3' and 'd', . . . is an image reading position error.

2. Second Embodiment

A second embodiment of the present invention will now be described.

2.1 Measurement Principle

Figure 19:
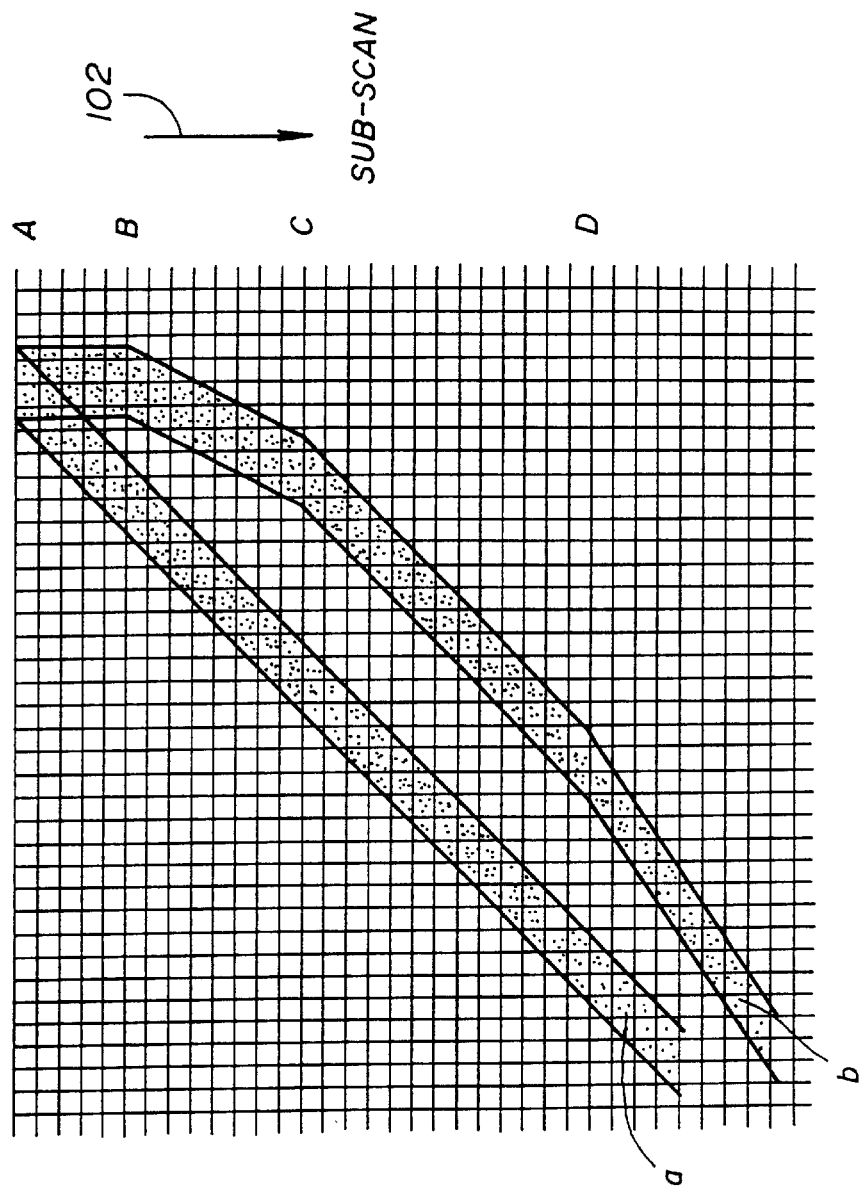
FIG. 19 illustrates the image reading position error measurement principle of a second embodiment of the present invention.

FIG. 19 illustrates a measurement principle of an image reading position error measuring device in a second embodiment of the present invention. The measuring principle of the second embodiment is substantially the same as the above-described measurement principle of the first embodiment in item 1.1. Accordingly, duplicated descriptions will be omitted.

2.2 System Configuration

Figure 20:
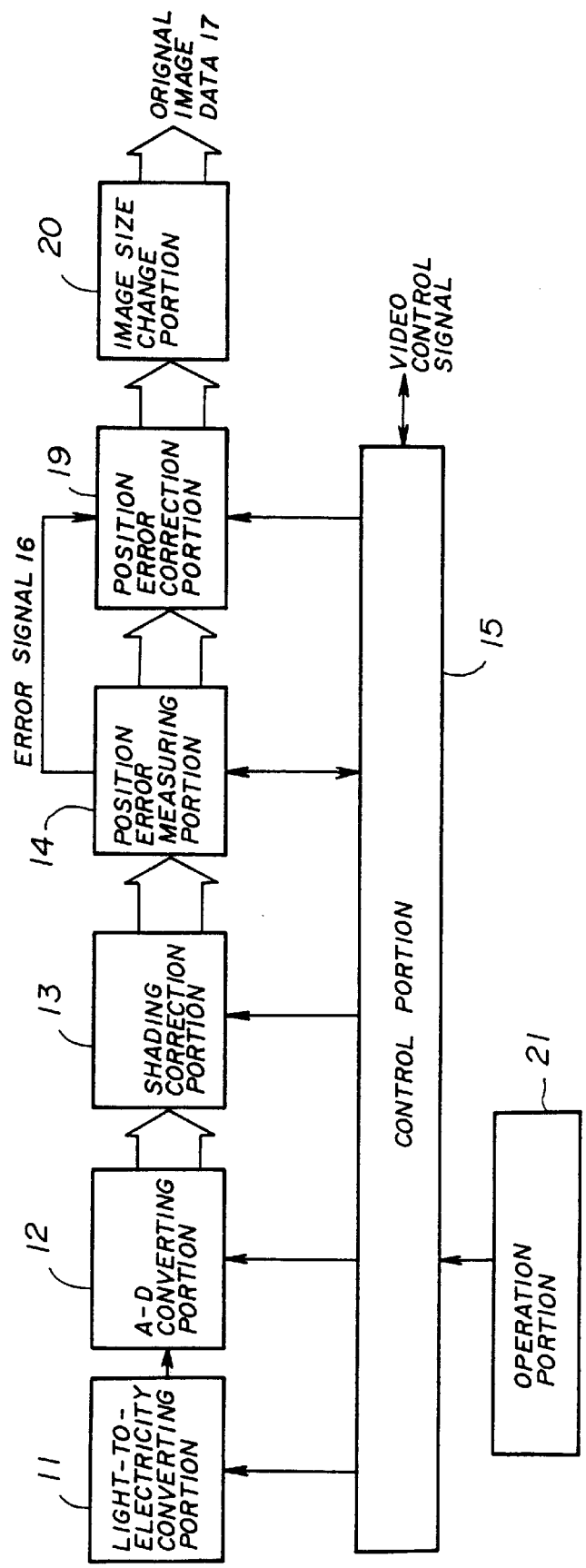
FIG. 20 shows a block diagram of a system arrangement of the second embodiment of the present invention.

FIG. 20 shows a block diagram of a basic system configuration of an image reading apparatus in the second embodiment of the present invention. This image reading apparatus incorporates therein the above-mentioned image reading position error measurement device. The image reading position error measurement device measures image reading position errors in a real-time manner in the image reading apparatus. Basically, this image reading apparatus includes a light-to-electricity converting portion 11, an A-D converting portion (or A-D converter) 12, a shading correction portion 13, a position error measuring portion 14, a control portion 15, a position error correction portion 19 and an image size change portion 20.

The light-to-electricity converting portion 11 includes, for example, a line of light-to-electricity electricity converting components, such as a line CCD (Charged-Coupled Device). Thereby, an original image is read and is converted into an electrical signal. The thus-obtained electric signal representing the original image is converted into digital, multilevel image data through the A-D converting portion 2. The thus-obtained image data undergoes a shading correction performed by the shading correction portion 3. Specifically, a shading error, included in the image data, due to illumination unevenness, lens periphery light intensity reduction, unevenness in sensitivity of the line of the light-to-electricity converting components among respective pixels, are compensated for. In the system configuration of the second embodiment, image data, which has undergone shading correction through the shading correction portion 13, is provided to the position error measuring portion 14. The position error measuring portion 14 measures an image reading position error, one main scan line by one main scan line, arranged in the sub-scan line direction. The thus-measured error signal 16 is provided to the position error correction portion 19. The position error correction portion 19 receives the error signal 16 together with the image data (video signal). The position error correction portion 19 determines a predetermined number of main scan lines of image data which are used for performing image reading position error correction, and stores that number of main scan lines of image data in a memory included in the position error correction portion 19. Further, the error signal 16 for the main scan line of image data is stored in the memory. The position error correction portion 19 uses the thus-stored data, and thus uses those adjacent main scan lines of image data and the error data indicated by that error signal 16. Thereby, the position error correction portion 19 calculates the image data values at the correct positions through an interpolation method using actually read image values of the actual sub-scan direction read positions. The video data, including the thus-corrected image data, is output from the position error correction portion 19, one main scan line by one main scan line. After performing the image reading position error correction, subsequent data is stored in the above-mentioned memory. The above-mentioned operation is repeated for the main scan lines of image data, respectively, in the sub-scan direction. Thereby, the entire page of the original image is processed, and the processed result is output from the position error correction portion 19. The output data is provided to the image size change portion 20. The function of the image size change portion 20 will be described later. The respective function blocks operate under control of the control portion 15. Specifically, the control portion 15 controls the timing according to which the function blocks operate, and sets operation conditions of those function blocks. The control portion 15 externally sends/receives an appropriate video control signal. The video control signal includes a well-known synchronization signal for taking synchronization of a video signal which carries image data, and a well-known gate signal which indicates effective portions of the image data. For example, the image reading apparatus is a digital copying machine, the video control signal includes a clock signal, a main-scan direction synchronization signal, a main-scan direction gate signal and a sub-scan direction gate signal. An operation portion 21 is connected to the control portion 15. Through the operation portion 10, an operator sets an image size change rate.

In a case where same-size sensors are used as the light-to-electricity converting portion in the image reading apparatus, there are no problems with lens periphery light intensity reduction due to lens characteristics. Therefore, the shading correction portion such as the shading correction portion 13 may be omitted. Even in such a case, the present invention can be applied.

2.3 Position Error Measuring Process

Figure 21:
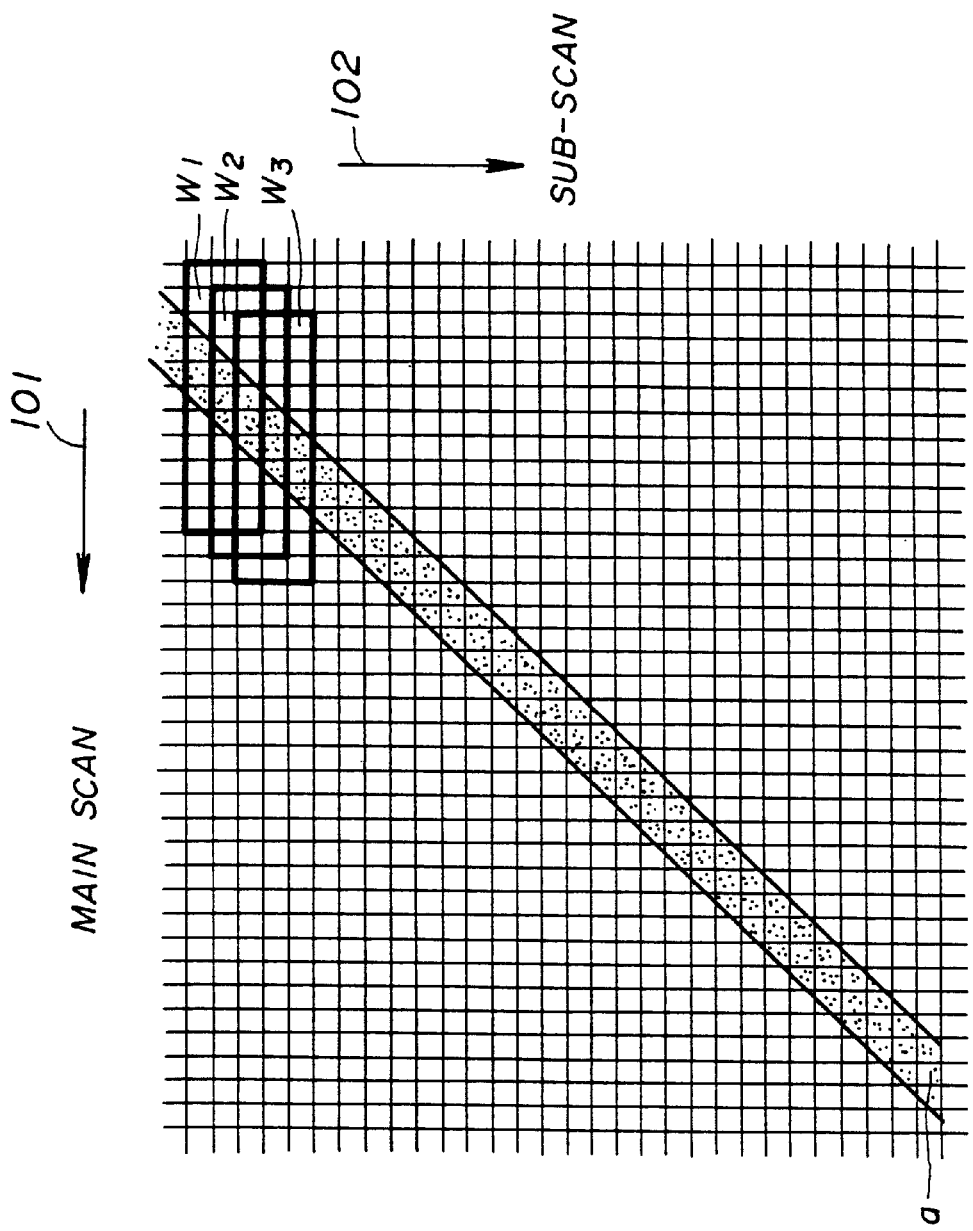
FIG. 21 illustrates image reading position error measurement when an oblique line image is present in a bit map in the second embodiment of the present invention.

FIG. 21 illustrates a position error measuring process using a line image 'a' in bit-map format image data which has been obtained through the light-to-electricity converting portion 11, A-D converting portion 12 and shading correction portion 13 shown in FIG. 20. The bit-map shown in FIG. 21 is similar to the bit-map shown in FIG. 19. A center-of-gravity measuring window $W_1$ has a size of 11 pixels by 3 pixels as shown in the figure. A position of the line image 'a' within the center-of-gravity measuring window $W_1$ in the main scan direction with respect to the center-of-gravity measuring window $W_1$ is obtained. For this purpose, the center of gravity of the image data of the pixels defined by the center-of-gravity measuring window $W_1$ in the main scan direction is calculated as will be described later. The thus-calculated center of gravity in the main scan direction may indicate the center of the line image 'a' defined by the center-of-gravity measuring window $W_1$. This center-of-gravity calculation is performed repeatedly each time after the position of the center-of-gravity measuring window $W_1$ is moved to the position $W_2$, the position $W_3, \ldots$, respectively, as shown in the figure. As shown in FIG. 21, the center-of-gravity measuring window moves in a direction which is 45° from the main scan direction 101 and also 45° from the sub-scan direction 102 in the condition where each pixel has a square shape, because the center-of-gravity measuring window moves one pixel by one pixel in the main scan direction, and simultaneously, one pixel by one pixel in the sub-scan direction. Therefore, the position of the center of gravity of the image data in the center-of-gravity measuring window in the main scan direction shifts one pixel by one pixel in the main scan direction as the center-of-gravity measuring window moves as mentioned above unless the positions of pixels of the line image 'a' shifts de to undesirable causes. If the center of gravity of the pixels in the center-of-gravity measuring window does not shift one pixel by one pixel in the main scan direction as the center-of-gravity measuring window moves one pixel by one pixel in each of the main scan direction and sub-scan direction simultaneously, the failure to shift would be due to various undesirable occurrences. Such a difference is an image reading position error which should be measured in the reading pixel position error measuring process according to the present invention. In other words, by determining whether or not the center of gravity of the pixels in the center-of-gravity measuring window shifts one pixel by one pixel in the main scan direction as the center-of-gravity measuring window moves one pixel by one pixel in each of the main scan direction and sub-scan direction simultaneously, it can be determined whether the line image formed in the bit-map from the read image data is such as the line image 'a' shown in FIG. 19 or is such as the line image 'b' shown in FIG. 19. In the case where the line image 'a' is formed from the read image data, the center of gravity of the pixels in the center-of-gravity measuring window shifts one pixel by one pixel in the main scan direction as the center-of-gravity measuring window moves one pixel by one pixel in each of the main scan direction and sub-scan direction simultaneously. Then, it can be determined that there is no image reading position error. Otherwise, it can be determined that there is some type of image reading position error. How far apart the calculated center of gravity is from a reference position of the center of gravity in the case where the center of gravity of the pixels in the center-of-gravity measuring window shifts one pixel by one pixel in the main scan direction as the center-of-gravity measuring window moves one pixel by one pixel in each of the main scan direction and sub-scan direction simultaneously indicates the degree of the image reading position error. The above-mentioned reference position of the center gravity is moved one pixel in the main scan direction each time the center-of-gravity measuring window moves one pixel in the main scan direction and one pixel in the sub-scan direction simultaneously. In a case where it is determined that a main cause of image reading position errors is an uneven the sub-scan direction scanning speed, it is easy to appropriately convert the data of an image reading position error into data of a sub-scan direction scanning speed error. Thereby, it is possible to correct the sub-scan direction scanning speed error.

When the center of gravity of the image data in the center-of-gravity measuring window is calculated, image data of many pixels including pixels surrounding the line image 'a' is also used. That image data may include various types of noise such as noise inherent in the CCD and so forth. The center of the line image 'a' is obtained by calculating the center of gravity of the image data in the center-of-gravity measuring window according to the present invention as mentioned above. By this method, in the process of calculating the center of gravity of the image data in the center-of-gravity measuring window, the effect of such noise can be reduced, because the image data of many pixels including pixels surrounding the oblique line image is used, and the noise generally appears at random throughout the entire area of the center-of-gravity measuring window, and may be canceled out by each other. Thus, the center of the line image 'a' can be obtained in a high S/N (signal to noise) ratio condition. Ordinarily, when the number of pixels defined by the center-of-gravity measuring window is increased, the S/N ratio is higher. It is preferable that the center-of-gravity measuring window is larger and thus compriese many pixels. It is preferable that the center-of-gravity measuring window is larger in the main scan direction because the center of gravity in the main scan direction is obtained. It is possible to perform the image reading position error measurement using a center-of-gravity measuring window having a length in the sub-scan direction of one pixel.

Figure 22:
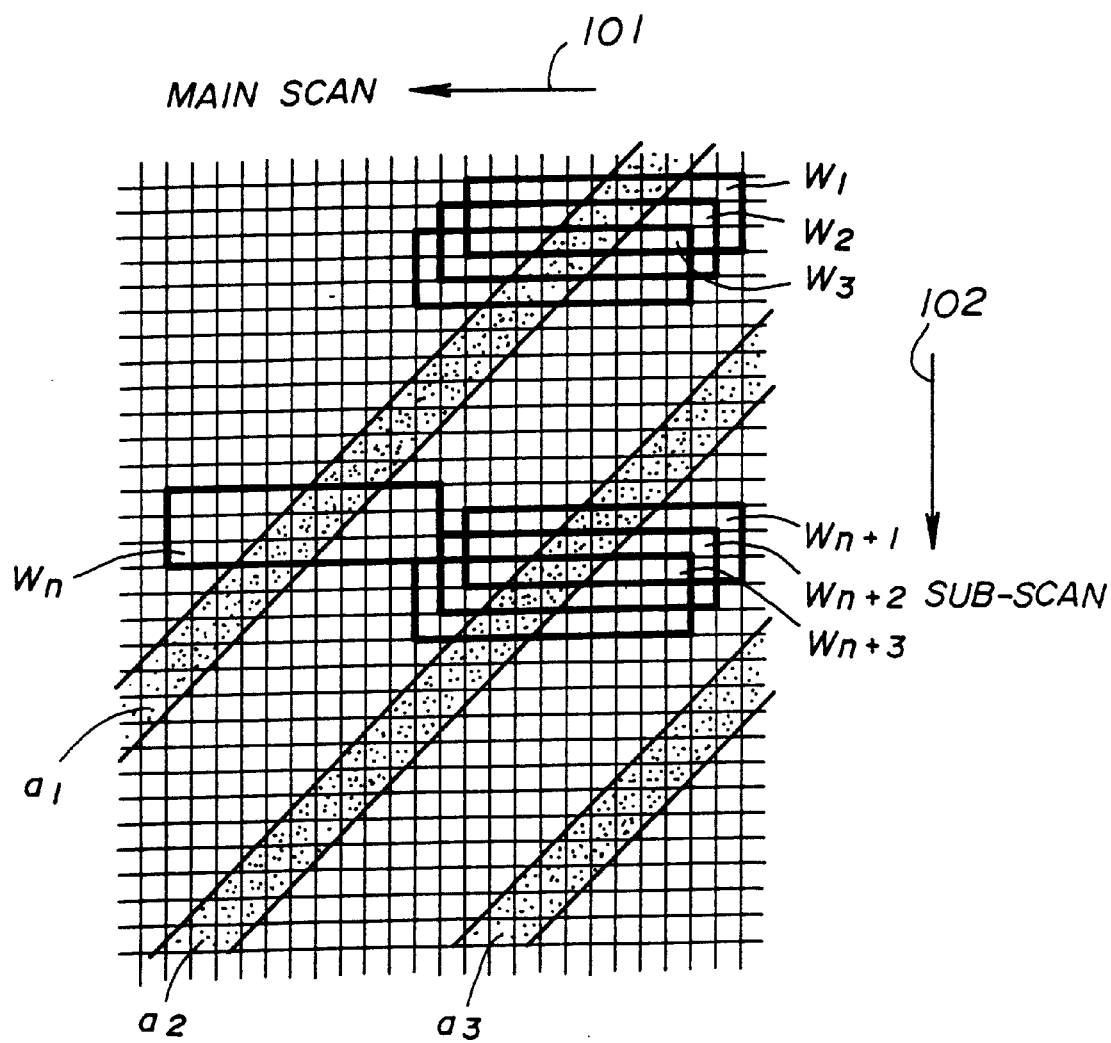
FIG. 22 illustrates movement of a center-of-gravity measuring window and a process thereof when measuring image reading position errors using a plurality of oblique line images on a bit map in the second embodiment of the present invention.

FIG. 22 illustrates a position error measuring process in which a plurality of parallel oblique line images $a_1$, $a_2$ and $a_3$, . . . , such as the oblique line image 'a' shown in FIG. 21, are used for measuring image reading position errors such as those described above. In this case, similar to the example shown in FIG. 21, the center-of-gravity measuring window is moved, repeatedly, one pixel by one pixel in the main scan direction, and simultaneously one pixel by one pixel in the sub-scan direction, into the positions $W_1$, $W_2$, $W_3$, . . . , as shown in FIG. 22. Then, after the number of moving operations reaches n–1, and thus the center-of-gravity measuring window is positioned at the center-of-gravity measuring window $W_n$, the center-of-gravity measuring window is moved into the position of the center-of-gravity measuring window $W_{n+1}$ shown in FIG. 22. The distance, in the main scan direction, between each adjacent pair of the oblique line images $a_1$, $a_2$, $a_3$, . . . is predetermined when a measuring chart or a test chart (having those oblique lines drawn thereon) is produced. This distance is a distance which the center-of-gravity measuring window moves in the reverse direction of the main scan direction, after moving, one pixel by one pixel in each of the main scan direction and sub-scan direction simultaneously, n–1 times. After moving that distance in the reverse direction of the main direction and simultaneously one pixel in the sub-scan direction, into the center-of-gravity measuring window $W_{n+1}$, the center-of-gravity measuring window is moved, one pixel by one pixel in each of the main scan direction and sub-scan direction simultaneously, into the positions $W_{n+2}$, $W_{n+3}$, . . . , respectively. By predetermining the above-mentioned distance in the main direction between each adjacent pair of the oblique line images to be an integer number of times of the size of each pixel, it is easy to perform appropriate correction using the distance when calculating movement of the center of gravity in the main scan direction. Each time after the center-of-gravity measuring window moves, one pixel by one pixel in each of the main scan direction and sub-scan direction simultaneously, the center of gravity of the pixels in the center-of-gravity measuring window is calculated and thus an image reading position error is detected as described above. Each time the center-of-gravity measuring window is moved in the reverse direction of the main scan direction, appropriate correction using the above-mentioned distance is performed when calculating movement of the center of gravity in the main scan direction. By predetermining the distance to be an integer number of times of the size of each pixel, that correction can be easily performed, and also inputting of the amount of correction to the measurement system can be easily performed.

In the above-described examples, the center-of-gravity measuring window is moved one pixel by one pixel. However, in a case where a frequency band of image reading position errors such as apparatus vibration is low, for example, it is possible that the center-of-gravity measuring window is moved two (or more) pixels by two (or more) pixels in each of the main scan direction and sub-scan direction simultaneously. Thereby, it is possible to shorten a time required for the image reading position error measurement.

By using a plurality of parallel oblique line images such as those shown in FIG. 22 in the image reading position error measurement according to the present invention, it is possible to perform the measurement throughout an original image reading area of the image reading apparatus even if the original image reading area is longer in the sub-scan direction and shorter in the main scan direction. Further, by using the plurality of parallel oblique line images in the measurement, it is possible to use the measuring chart or pattern which is longer in the sub-scan direction and shorter in the main scan direction. By positioning such a long and narrow measuring chart along the sub-scan direction at various different positions in the main scan direction, it is possible to perform the image reading position error measurement for various positions separately.

In the above-described measuring method, it is not necessary to make the oblique line images of the measuring chart finer in order to improve the resolution of the image reading position error measurement. It is possible to use oblique lines, each of which is wide, such that the lines may not be adversely affected by the MTF of the apparatus. By thus using the wide line pattern, the center-of-gravity measuring window should be enlarged. Thereby, it is possible to improve accuracy of the reading pixel position error measurement. In a case where the measurement is performed in a real-time manner, the width of each line of the oblique line pattern of the measuring chart may be determined in consideration of a balance between the data processing rate, the data storage size of buffers, and the circuit scale of the measurement system.

In the above-described examples, the center of an oblique line image is obtained by calculating the center of gravity of the pixels in the center-of-gravity measuring window. However, it is also possible to use a wider line image and the position of an edge of the line image is obtained in a well-known manner. Also in such a method, the image reading position error measurement can be performed similarly.

Further, in the above-described methods in the present invention using one or a plurality of parallel oblique line images, a portion(s) of the oblique line images scanned by each main scan line is (are) identical in successive main scan lines when ignoring position shift along the main scan direction. Therefore, the state of the portion of the oblique line image defined by the center-of-gravity measuring window is always approximately fixed as shown in FIGS. 21 and 22. Thereby, the above-mentioned 'Moire' effect problem, which cannot be avoided in the method using the test chart of the even-pitch lines arranged in the sub-scan direction in the related art described above, can be avoided in the present invention. Thus, it is possible to perform a highly accurate reading pixel position error measurement.

2.4 Calculation of the Center of Gravity from Image Data in the Window

Figure 23:
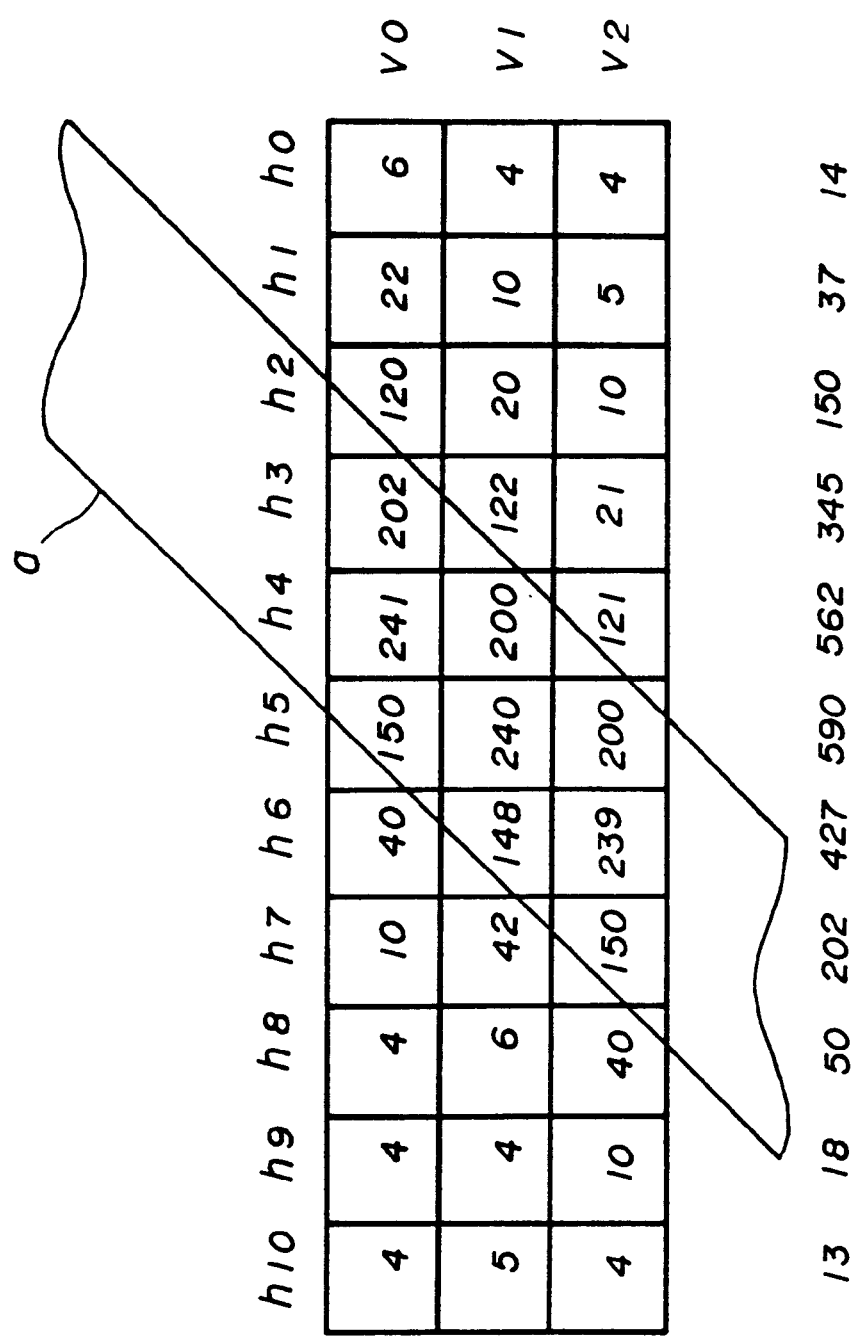
FIG. 23 shows a relationship between read image data values in the center-of-gravity measuring window and an oblique line image.

FIG. 23 shows a positional relationship between the pixels defined by the center-of-gravity measuring window and the oblique line image 'a'. In the figure, the image data of the pixel is indicated in each pixel. The image data is the image data obtained as a result of reading an oblique line. The image data of each pixel is 8-bit digital data, and may be represented by a decimal-system value of 0 to 255. The image data of each pixel shown in the figure is indicated by the decimal-system value.

When calculating the center of gravity of the pixels in the center-of-gravity measuring window, the totals of the image data of pixels is obtained for each column. The totals of the image data of pixels obtained for those columns, from the right of FIG. 23, $h_0, h_1, h_2, \ldots, h_{10}$ are referred to as $c_0, c_1, c_2, \ldots, c_{10}$, respectively. Those totals are 14, 37, 150, 345, 562, 590, 427, 202, 50, 18 and 13, respectively. Assuming that the main scan direction coordinate values of the centers of those pixels are, from the right of FIG. 23, 0 to 10, respectively, $$c_0(m-0)+c_1(m-1)+c_2(m-2)+\ldots+c_{10}(m-10)=0,$$

where the coordinate value of the center of gravity in the main scan direction is 'm', because the overall moment about the center of gravity 'm' is 0. Thus, the center of gravity in the main scan direction of (the image data of) the pixels in the center-of-gravity measuring window is calculated. After applying the above-mentioned specific values of the image data column totals $c_0, c_1, c_2, \ldots c_{10}$ and solving the above-mentioned equation, the center of gravity:

m=4.667.

is obtained.

When obtaining the center of gravity, a preceding calculation such as an interpolation operation is not needed. Therefore, this method is advantageous for simplifying the calculation process, and achieving a high-speed calculation. Instead, it is also possible to obtain the position of the oblique line image in another manner. That is, an interpolation operation is performed on the series of the image data column totals $c_0, c_1, c_2, \ldots, c_{10}$, and a data series in a predetermined resolution is obtained. From the obtained data series, the position at which the peak value is present may be obtained.

2.5 Relationship between Shift of the Oblique Line Image in the Center-of-Gravity Measuring Window and Sub-Scan Direction Image Reading Position Error In this embodiment, a sub-scan direction image reading position error is measured by measuring shift of the oblique line image of the read image data of the pixels in the main scan direction in the center-of-gravity measuring window. In the case described above where the pixel size is the same in the main scan direction and in the sub-scan direction, and the 45° oblique line image is used as the measuring chart, as is obvious from the above descriptions, a measured shift of the oblique line image of the read image data of the pixels in the main scan direction in the center-of-gravity measuring window directly indicates a sub-scan direction image reading position error. In another case where the pixel size is not the same in the main scan direction and in the sub-scan direction, and/or oblique lines of the measuring chart are not 45° oblique lines, an appropriate conversion is performed for obtaining sub-scan direction image reading position errors.

2.6 Measuring Operation Procedure

Figure 24:
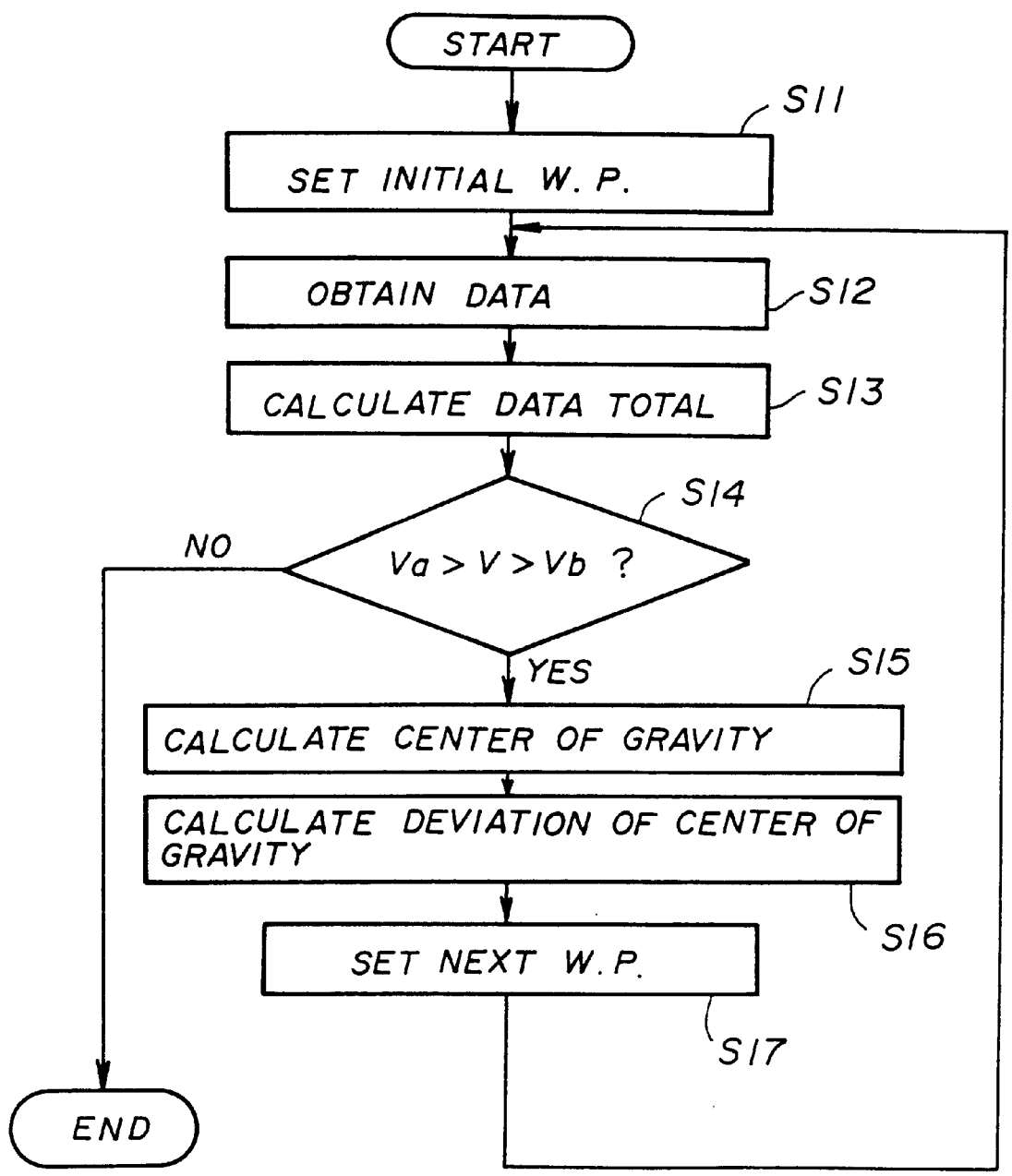
FIG. 24 shows a flowchart of a process sequence of a center of gravity deviation measuring process of the second embodiment.

FIG. 24 shows an operation flowchart of the image reading position error measurement in the second embodiment of the present invention. First, a window pointer (W. P.) which indicates the position of the center-of-gravity measuring window is set in a step S11. Then, in S12, the image data of the pixels in the center-of-gravity measuring window at the position indicated by W. P. is obtained. In S13, the total V of the obtained image data is calculated. In S14, it is determined whether or not Va>V>Vb, where Va and Vb are predetermined threshold values, respectively. When it is determined that the value V is a value between the predetermined values Va and Vb in S14, the above-described calculation of the center of gravity using that image data is performed in S15. In S16, the main scan direction positional deviation between the calculated center of gravity and the above-mentioned reference position of the center of gravity is calculated. Then, a next W. P. is set in S17, and the operation returns to S12. Then, the above-described operation is repeated.

If it is determined in S14 that the image data total V is not between Va and Vb, the current operation is terminated. The reason therefor will now be described. There may be a case where there are no pixels in the current center-of-gravity measuring window representing any portion of the oblique line image due to an erroneous setting of the W. P. or other causes. In such a case, it is useless to further process that image data. Therefore, the current operation is terminated in that case. There may also be a case where the center-of-gravity measuring window has completed passing through all of the oblique lines provided on the measuring chart. In such a case, by performing such a determination as S14, it is possible to automatically terminate the measuring operation.

2.7 General Configuration of the Apparatus

FIG. 25 shows an elevational sectional view of a general configuration of an image reading apparatus in the second embodiment of the present invention. On the top of an enclosure 28, a contact glass 21 is provided. The contact glass 21 will have a paper sheet, on which an original image is provided (hereinafter, the paper sheet is referred to as an 'original image object'), placed thereon. The contact glass 21 is supported by the enclosure 28. The original image object is placed on the contact glass 21 in a position where the original image provided thereon faces the contact glass 21. An illumination light source 22 emits light onto the original image through the contact glass 21, and light reflected by the original image is projected onto the light reception surface of the light-to-electricity converting component of the light-to-electricity converting device 27 having the line of light-to-electricity components, through a first mirror 23, a second mirror 24, a third mirror 25 and an image forming lens 26. Thus, the original image of the original image object is converted into an electrical signal, which undergoes predetermined processing and is output from the image reading apparatus.

The illumination light source 22 and first mirror 23 are mounted on a first carriage (not shown in the figure) which moves, as a result of being driven by a driving device (not shown in the figure), so that the distance from the contact glass 21 is fixed, for reading the original image one main scan line by one main scan line. The second mirror 24 and third mirror 25 are mounted on a second carriage (not shown in the figure) which moves similarly to the first carriage, but at a speed half the speed at which the first carriage moves. Thus, the original image of the original image object on the contact glass 21 is scanned and is read one main scan line by one main scan line.

Figure 26:
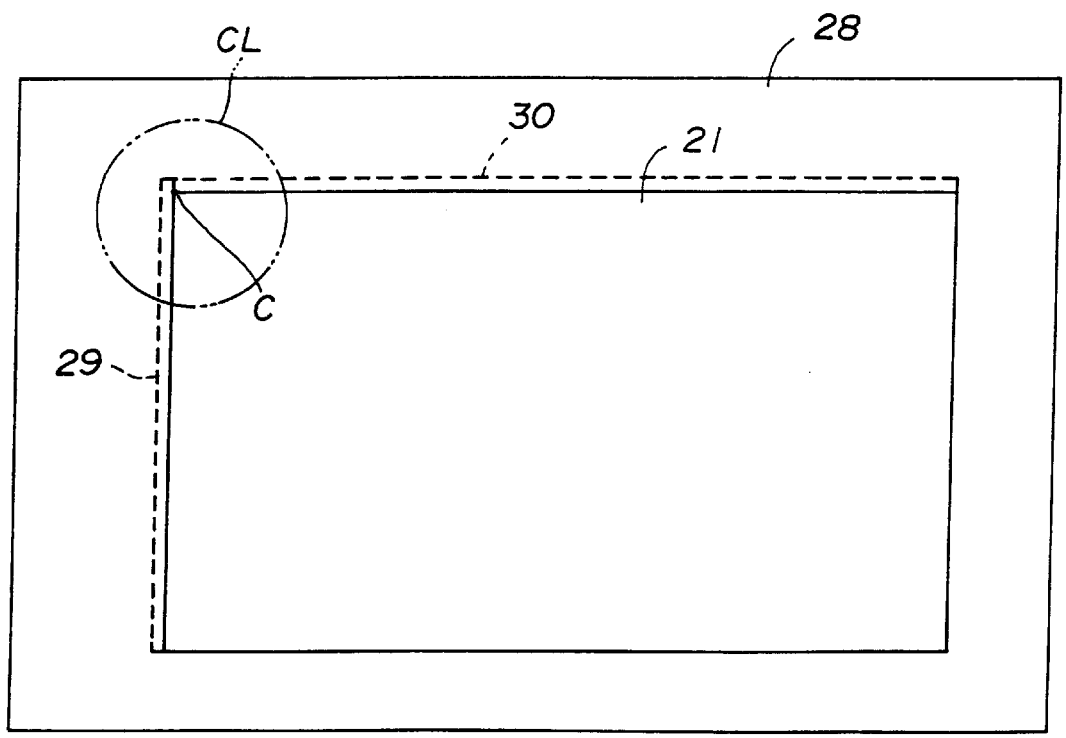
FIG. 26 shows a plan view of the image reading apparatus in the second embodiment.

FIG. 26 shows a plan view of the image reading apparatus shown in FIG. 25. As shown in the figure, the contact glass 21 is provided at the top of the enclosure 28. A reference tone plate 29 is provided at a side of the contact glass 21. The reference tone plate 29 is used for providing reference data which is read through the light-to-electricity converting unit, and then is used for shading correction, such as that mentioned above. The shading correction is performed in the image reading apparatus. Further, a measuring chart 30, having a measuring pattern provided thereon, being used for the read image data pixel position error measurement such as that described above performed in the image reading apparatus, is provided at a side of the contact glass 21. The reference tone plate 29 and measuring chart 30 are provided in a manner such that they can be adequately read by the light-to-electricity converting device 27 which is provided inside the enclosure 28. Because the measuring chart 30 is read through the light-to-electricity converting device 27 together with an original image object which may be placed on the middle of the contact glass 21, it is necessary that those images corresponding to the measuring chart as well as the original image object are adequately formed on the light-to-electricity element components. For this purpose, the measuring chart 30 is provided on the surface of the contact glass 21, which surface is the top surface thereof, and the original image object will also be placed thereon.

Figure 27:
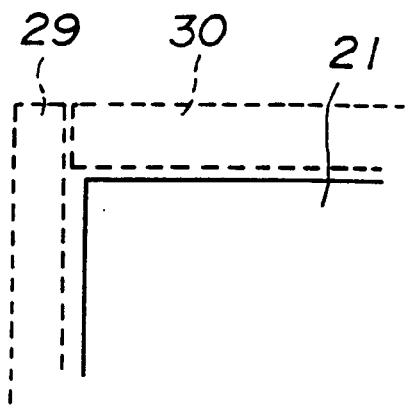
FIG. 27 shows a magnified view of a portion of FIG. 26 encircled by a circle CL.

FIG. 27 shows magnified details of the portion shown in FIG. 26 and encircled by the circle CL. As shown in the figure, the reference tone plate 29 is extended in the reverse direction of the main scan direction so that the pixels of the light-to-electricity converting component (such as the line CCD as mentioned above, extending in the main scan direction throughout the contact glass 21) which are used for reading the measuring chart can also be used for reading the reference tone plate 29. Thereby, the shading correction can be performed also on the image data obtained from the measuring chart 30.

Figure 28:
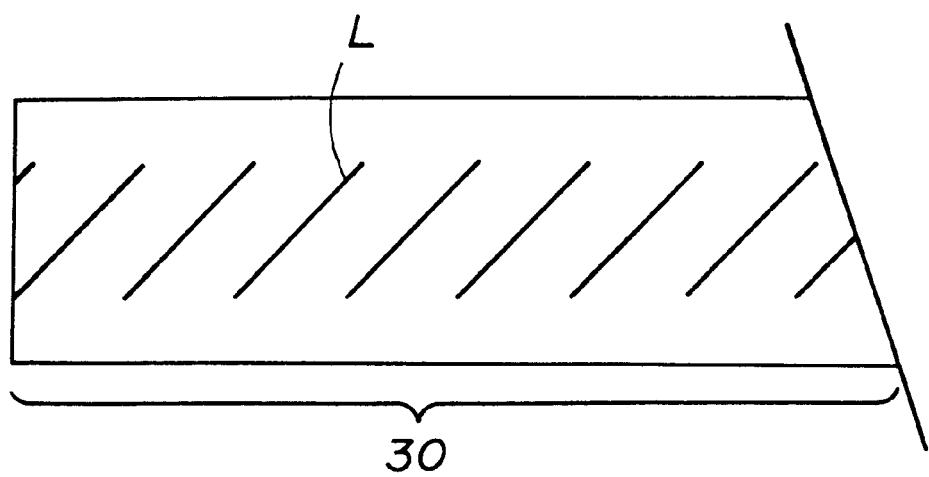
FIG. 28 shows a magnified view of a portion of a measuring pattern shown in FIG. 26.

FIG. 28 shows a partial magnified bottom view of the measuring chart 30. As shown in the figure, the measuring chart 30 has black oblique lines L and a white background. This measuring chart 30 includes oblique lines. The oblique lines are read in the image reading apparatus and the oblique line images described in the items 2.1 and 2.3 are generated. The measuring chart 30 is provided at the position shown in FIG. 26 outside the contact glass 21, and is read, simultaneously with the original image object being read, and used for the image reading position error measurement.

2.8 Read Image Data Position Deviation due to Image Reading Position Error

FIG. 29 illustrates the image reading position error correction operation. The vertical axis of the graph shown in FIG. 29 represents image data values of image data which underwent the shading correction by the shading correction portion 13 shown in FIG. 20. The image data values are 8-bit digital values, and thus have decimal-system values of 0 to 255. The horizontal axis of this graph represents sub-scan direction position or main scan lines which are arranged in the sub-scan direction. Those positions along the horizontal axis, to which positive integers are allocated, represent main scan lines which correspond to line reading timing signals produced from dividing an oscillation frequency of a crystal oscillator included in the above-mentioned control portion 15. Because stability of the oscillation frequency from the crystal oscillator is very high, those positions to which the integers are allocated, represent correct positions of main scan lines. Further, the distance between each pair of adjacent positions of those positions corresponds to a distance between adjacent dots of 400 dpi which is the reading resolution of the image reading apparatus.

In order to reduce a required memory storage capacity to a minimum, image reading position errors are corrected in a real-time manner in this example. Further, it is preferable that a circuit scale required for this operation be miniaturized and that cost reduction be realized. For these purposes, it is effective to simplify a calculation required for the image reading position error correcting operation. Therefore, in FIG. 29, 16 divisions are marked between each pair of adjacent positions to which the integers are allocated.

The example shown in FIG. 29 is based on an assumption that, at the horizontal axis position of '0', the position defined by the control portion 15 is coincident with the actual sub-scan direction read position. There are various possible causes of image reading position errors. Among them, reading carriage (such as the above-mentioned first carriage) speed variation is a likely cause. The example shown in FIG. 29 is based on an assumption that the speed of the above-mentioned first carriage is $\frac{1}{16}$ faster, that is, approximately 6% faster, than a predetermined speed. In a case where the first carriage moves at the predetermined speed, the image at the position of '1' at the horizontal axis of FIG. 29 is read. However, because the first carriage moves faster than the predetermined speed, as mentioned above, actually, the image at the position 'b' is ahead by $\frac{1}{16}$ dot from where the position of '1' is actually read. In FIG. 29, image data values, when the image data values are obtained from reading the images at correct positions which are defined by the control portion 15, are represented by larger circles, while image data values, when the image data values are obtained from reading the image at erroneous positions due to the above-mentioned first carriage speed error, are represented by smaller circles. The image reading position error measurement is performed in a manner in which a read position at a preceding reading operation is used as a reference, and thereby a deviation of a read position at a current reading operation is measured, for each main scan line reading operation. Therefore, at the reading operation of the sub-scan line direction position '1', the value '$\frac{1}{16}$' (dot) is measured as an image reading position error. This error data is output from the position error measuring portion 14 shown in FIG. 20 together with the image data value of a currently read image, to the position error correction portion 19. The above-described calculation of the center of gravity in the image reading position error measurement has an accuracy higher than the value $\frac{1}{16}$. However, in this example, the calculation result is rounded to have a resolution of $\frac{1}{16}$ in the position error correction portion 19.

The first carriage speed is fixed to be faster by $\frac{1}{16}$ than the predetermined speed. Thereby, a subsequent image reading position error, which is measured from a reading position at the preceding reading operation as a reference, is the same '$\frac{1}{16}$'. However, the overall image reading position error at this time, when the sub-scan direction position '2' is used as a reference, is '$\frac{2}{16}$' because the image reading position error of '$\frac{1}{16}$' is already present in the preceding reading operation as mentioned above. The reading position in the second reading operation is 'c' which is ahead by 2/16 from the correct position '2' as shown in FIG. 29. Similarly, in the subsequent third reading operation, the overall image reading position error is '3/16' which is a difference between the correct position '3' and the actual erroneous position of 'd'. Similarly, subsequently, the images at the positions 'e', 'f', 'g', . . . are actually read, respectively. Thus, a position of each image actually read is defined by accumulating respective image reading position errors, the error in each main scan line reading operation being '1/16' as mentioned above. The actually read image data values are allocated at the actual sub-scan direction read positions of the horizontal axis at a resolution of 1/16, respectively. Those actually read image data values are represented by the small circles at those positions, 'a', 'b', 'c', 'd', 'e', 'f' and 'g', shown in FIG. 29. Here, the case where the sub-scan direction scanning speed is faster than the predetermined speed has been described. However, when the sub-scan direction scanning speed is slower than the predetermined speed, image reading position errors occur in the reverse direction.

2.9 Read Image Data Correction

From these actually read image values, which include image reading position errors, the image values at the correct positions, which are represented by the larger circles at the positions, '0', '1', '2', '3', '4', '5', '6' and '7', are estimated (calculated) by performing an interpolation operation. For example, when the image data at the position '2' is estimated, a cubic function convolution method may be applied using the two preceding read image data values at the positions of 'a' and 'b', and also the two subsequent read image data values at the positions of 'c' and 'd'. (With regard to the cubic function convolution method, see U.S. Pat. No. 4,827,433 of Kouich Kamon, column 5, lines 11–30, for example.) According to this method, each of the image data values at the correct positions is estimated using the two preceding read image data values and also the two subsequent read image data values. The interpolation method to be used in the read pixel data correction is not limited to the cubic function convolution method. Other various interpolations can be used for this purpose. Furthermore, the number of read image data values to be used for the interpolation operation can be changed appropriately.

By using the interpolation method, image reading position errors are effectively corrected, and thus, good image data is obtained. However, the amount of data processing for the interpolation operation is large. When correcting image reading position errors in the sub-scan direction, the correction operation is performed for 5,000 pixels of data which are arranged in the main scan direction. Accordingly, when achieving real-time operation, a data processing circuit and a buffer memory are needed, the data processing circuit being of a large scale and thus being able to perform high-speed operation.

In contrast to this, it is also possible to perform sub-scan direction image reading position error correction by using image data of a main scan line, among read main scan lines, the actual sub-scan direction read position of which is nearest to a correct position as image data of the correct position. Thus, only the main scan line of the nearest position is selected from among the read main scan lines. Thereby, the necessary process is completed by a simple operation for each main scan line. It is not necessary to perform the correction operation for each pixel of a main scan line as in the above-described method. Thereby, the amount of data processing required for the interpolation operation is remarkably reduced. This process will now be described with reference to FIG. 29.

In this process, the image data at the 'a' position is used as the image data at the '0' position. The image data at the 'b' position is used as the image data at the '1' position. That is, the image data at the actual sub-scan read position nearest to a correct position is selected from among the image data at 'a', 'b', 'c', 'd', 'e', 'f', . . . positions. The selected image data is used as the image data at the correct position.

Ordinary fluctuations of sub-scan direction scanning speed of an image reading apparatus is about 1% of the rated speed. The distance between adjacent read main scan lines is approximately close to a predetermined resolution. When the image data at the nearest actual sub-scan read position is used as the image data at a correct position, even if a correct position is positioned at the center between adjacent actual sub-scan direction read positions, this situation being the worst situation, the remaining image reading position error is merely ½ of the resolution. Accordingly, accuracy such that the remaining image reading position error is not more than ½ dot is ensured. For many uses of such an image reading apparatus, such a position accuracy is sufficient. In a conventional flat-bed type image reading apparatus, it is very difficult to eliminate speed fluctuation of a carriage for scanning an original image object. Thereby, there may be relatively large image reading position errors. However, according to the present invention, repetitive oblique lines are read, the thus-obtained image data is used for measuring image reading position errors, and image data is corrected using the thus-obtained image reading position errors. Thereby, it is possible to provide an image reading apparatus with small image reading position errors with a very simple arrangement.

2.10 Operation in Case of Image Size Change Reading

Before describing image size change reading, equal size image reading (same-size image reading) will be described. In the image reading apparatus in the embodiment, the line CCD is used as an image reading device. This apparatus has a function of reading an A-3 size original image object as the shorter side of the object is the main scan direction with a resolution of 400 dpi. In the line CCD, 5000 light-reception elements are arranged with 10 μm pitch. As the resolution is 400 dpi, the length corresponding to 1 dot on an original image object is obtained as follows:

$$25.4/400 = 0.0635 \text{ (mm)}.$$

That is, 63.5 μm. When an image of this size is formed on the CCD, it is reduced to 10 μm (the size of 1 dot of the CCD) and is projected onto the CCD. Thus, the same-size image is formed as a result of the image of an original image object being reduced to 1/6.35. With regard to the sub-scan direction, the carriage moves and thus the original image object is scanned. The scanning speed is a speed such that the carriage moves 63.5 μm during the time of one pulse of sub-scan line clock pulses. As the original image object is scanned at this speed, the image data is read at each line clock pulse. Thus, one main scan line of image data is read at one line clock pulse.

When reading an image with a different image size change rate, the magnification of the optical system is not changed from that of the case of equal size image reading (same-size image reading). The speed of scanning an original image object in the sub-scan direction is changed according to the image size change rate. For example, when the image size change rate is '2', the speed of the sub-scan direction line clock pulses is not changed, and the speed of the carriage for scanning an original image object is half of that of the case of the equal size image reading (same-size image reading). The change of the speed of the carriage is performed by changing the rotation speed of the motor which drives the carriage. The image data obtained at one sub-scan line clock pulse is treated as data 63.5 μm away from one another in the case of the equal size image reading (same-size image reading). Thereby, image data doubled in the sub-scan direction is obtained. However, because the magnification of the optical system is not changed, the size of the image is not changed with regard to the main scan direction. In order to obtain the doubled image in the main scan direction, the image data equal to the image data which should be obtained when reading the image with the changed magnification of the optical system is obtained from the image data which is obtained from reading the image with unchanged magnification (magnification for equal size image reading (same-size image reading)) of the optical system, using an interpolation method. As the interpolation method, the above-mentioned cubic function convolution method is used. The above-described function is the function of the image size change portion 20 shown in FIG. 20. After doubling the image in the main scan direction in the image size change portion 20, the image data 17 of the doubled image in the main scan direction and also in the sub-scan direction is provided. Here, the case where an image is doubled has been described for the sake of simplification. However, when an image is read at a different size change rate, a similar operation is performed.

Figure 30:
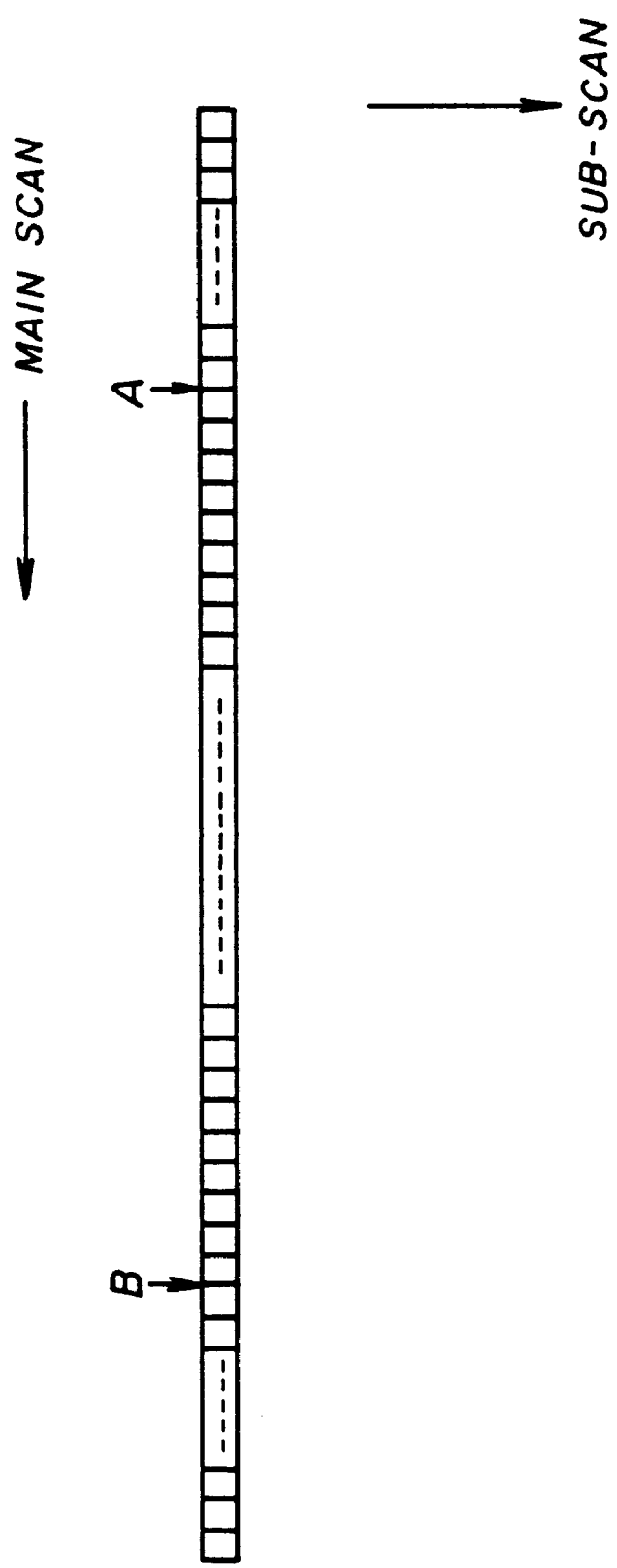
FIG. 30 shows a spatial relationship between a scope of image data for which an image size change process in the main scan direction is performed and an original point of the image size change process in the second embodiment.

An outline of image size change reading has been described. With reference to FIG. 30, image data of a repetitive oblique line pattern which is provided for obtaining image reading position errors and is positioned outside the area by which an original image is read, and a spatial relationship between a scope of image data for which an image size change process in the main scan direction is performed and an original point of the image size change process will now be described.

With reference to FIG. 30, a horizontally long rectangle of an arrangement of squares represents an arrangement of image data of one line of the main scan direction read by the line CCD, and also, represents an arrangement of the light-reception elements of the line CCD. Electrical signals obtained from light-to-electricity conversion through the line CCD are simultaneously transferred to shift registers built in the CCD. Then, in synchronization with main scan clock pulses, the image data stored in the shift registers is output sequentially according to the main scan direction shown in FIG. 30 by an arrow 'MAIN SCAN'. The arrow represents a time progression direction. The image data is output sequentially from the right of the drawing. The scope between 'A' and 'B' corresponds to the area in the main scan direction, of the image reading apparatus, by which an original image is read. In FIG. 26, the position of the CCD onto which the top side of the original image reading area is projected is 'A' and the position of the CCD onto which the bottom side of the original image reading area is projected is 'B'.

The image of the repetitive oblique line pattern (which is positioned at the top side of the image reading area in FIG. 26) provided for obtaining image reading position errors is formed in the scope between the right end and 'A' of the arrangement of image data shown in FIG. 30. The carriage is moved in the sub-scan direction as this spatial relationship is maintained. Thus, image reading in the main scan direction is repeated line by line, and thereby, the image data is obtained. An original image object is placed on the contact glass 21 so that a corner of the original image object is positioned at the top-left position 'C' of the contact glass 21. This position 'C' corresponds to 'A' of the arrangement of image data shown in FIG. 30. This position 'C' is used as the original point. Because the magnification of the optical system is not changed as described above, when performing the image size change reading, the position of the image in the main scan direction is not changed. Accordingly, the position of the image of oblique line pattern in the main scan direction is not changed. However, because the carriage moving speed in the sub-scan direction is changed, the inclination of each oblique line image is changed according to the speed, as shown in FIGS. 17, 18. Because the width of each oblique line image in the main scan direction is not changed when performing the image size change reading, no particular process should be previously performed for obtaining image reading position errors. However, for the image obtained from reading the original image, it is necessary to perform an image size change process in the main scan direction. The position 'C' of the contact glass 21 is used as the original point, this position corresponds to 'A' of the arrangement of image data and a corner of an original image object is positioned at this position. Accordingly, read image data between 'A' and 'B' is converted into image data of a predetermined different size using the point 'B' as the reference point. In the conversion, the above-described cubic function convolution method is used.

Thus, when performing image size change reading, for image data of oblique lines for obtaining image reading position errors, no size change process in the main scan direction is performed. For image data of an original image, the size change process in the main scan direction is performed. Thus, when image size change is performed, there is no change of the magnitude of image data of oblique lines and image position due to the main scan direction image size change process. Accordingly, it is not necessary to change the size of the center-of-gravity measuring window and it is not necessary to change the coordinates of an oblique line image in the main scan direction. Thus, image reading position errors can be obtained in a condition where no image size change in the main scan direction has been performed. Accordingly, an arrangement of obtaining image reading position errors can be simplified.

2.11. Image Reading Position Error Measurement Procedure

Image reading position error measurement procedure in the second embodiment is the same as that in the first embodiment described in item 1.6. Accordingly, duplicate descriptions will be omitted.

2.12. Relationship between Oblique Line Image Movement in the Main Scan Direction and Actual Sub-scan Direction Reading Position The relationship between an amount of movement of oblique line image in the main scan direction and an actual sub-scan direction reading position in the second embodiment is the same as that in the first embodiment described in item 1.7. Accordingly, duplicate descriptions will be omitted.

3. Third Embodiment

A third embodiment of the present invention will now be described. In an image reading apparatus in the third embodiment, when performing image size change reading, the image forming magnification of the optical system is changed to a predetermined value, and also, the sub-scan direction scanning speed is changed according to the change of the magnification. The image reading apparatus includes the functions of measuring image reading position errors and correcting the image reading position errors based on the data obtained from the image reading position error measurement.

The change of the magnification of the optical system is performed using the 'A' point in FIG. 30 of the second embodiment as the reference point. Thus, when image size change rate is changed, the position at which the position 'C' on the contact glass 21 in FIG. 25 of the second embodiment corresponding to the position 'A' is projected onto the light-reception portion of the CCD is not changed. The change of the magnification of the optical system is performed as a result of moving the image forming lens 26 with respect to the light-to-electricity converting device 27 shown in FIG. 25. The moving of the image forming lens 26 is performed by a driving device (not shown in the figure). With regard to the sub-scan direction, an arrangement and functions for image size change reading are the same as those of the second embodiment. In the third embodiment, because image size change reading is performed with regard to the main scan direction and sub-scan direction, no additional process is needed for read image data. However, in the third embodiment, when reading magnification is changed, because the magnification of the optical system is changed, the size of the image obtained from reading the repetitive oblique line pattern for obtaining image reading position errors is also changed in the main scan direction. The image data obtained from reading the oblique lines with the different magnification is converted into the image data equal to the image data which should be obtained from reading the oblique lines with the magnification of the optical system for the equal size image reading (same-size image reading). Thereby, using the thus-converted image data, the image reading position error measurement process can be performed similar to that in the case of using the image data obtained from reading the oblique lines with the magnification of the optical system for the equal size image reading (same-size image reading).

Figure 31:
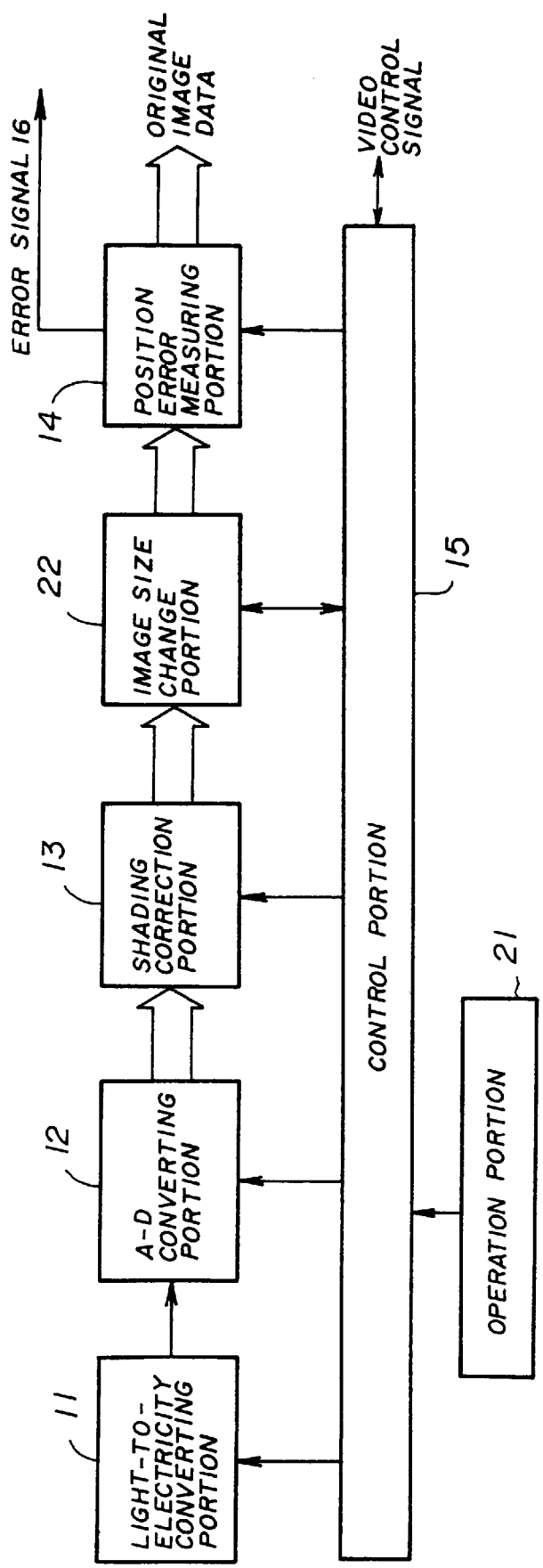
FIG. 31 shows a block diagram of a system arrangement of a third embodiment of the present invention.

As mentioned above, the magnification change was performed optically using the point 'A' as the reference point. Accordingly, the image data obtained from reading the oblique lines with the different magnification of the optical system is converted into the image data equal to the image data which should be obtained from reading the oblique lines with the magnification of the optical system for the equal size image reading (same-size image reading), using the point 'A' as the reference point. This conversion is substantially the same as the conversion of the image data obtained from reading an original image with the magnification of the optical system for the equal size image reading (same-size image reading) into the image data equal to the image data which should be obtained from reading the image with the different magnification of the optical system, in the second embodiment. However, while the image is magnified in the main scan direction in the second embodiment, the size of the image is reduced in the main scan direction. The conversion of the input image data into the image data equal to the image data which should be obtained from reading the oblique lines with the magnification of the optical system for the equal size image reading (same-size image reading) is performed by an image size change portion 22 shown in FIG. 31. After converting the input image data into the image data equal to the image data which should be obtained from reading the oblique lines with the magnification of the optical system for the equal size image reading (same-size image reading), the resulting image data can be used for image reading position error measurement in the position error measuring portion 14, shown in FIG. 31, in the same manner as the case where the image data obtained from reading the oblique lines with the magnification of the optical system for the equal size image reading (same-size image reading) is used for the same purpose. Thus, when image size change is performed, the image data of the oblique lines is converted into the image data equal to the image data obtained from reading the oblique lines with the magnification for the equal size image reading (same-size image reading). Thereby, it is not necessary to change the size and position of the center-of-gravity measuring window according to the reading magnification. Thus, it is possible to simplify the arrangement for image reading position error measurement. Further, as mentioned above, an image obtained from reading an original image has undergone optical size change with regard to the main scan direction. Accordingly, for the original image, no other image size change process should be performed.

Each portion, not particularly described above, is substantially the same as the respective portion of the second embodiment and operates similarly. Accordingly, duplicate descriptions will be omitted.

Thus, the same image reading position error measurement system can be used for the image size change method of the second embodiment and for the image size change method of the third embodiment.

4. Computer Control

Figure 32:
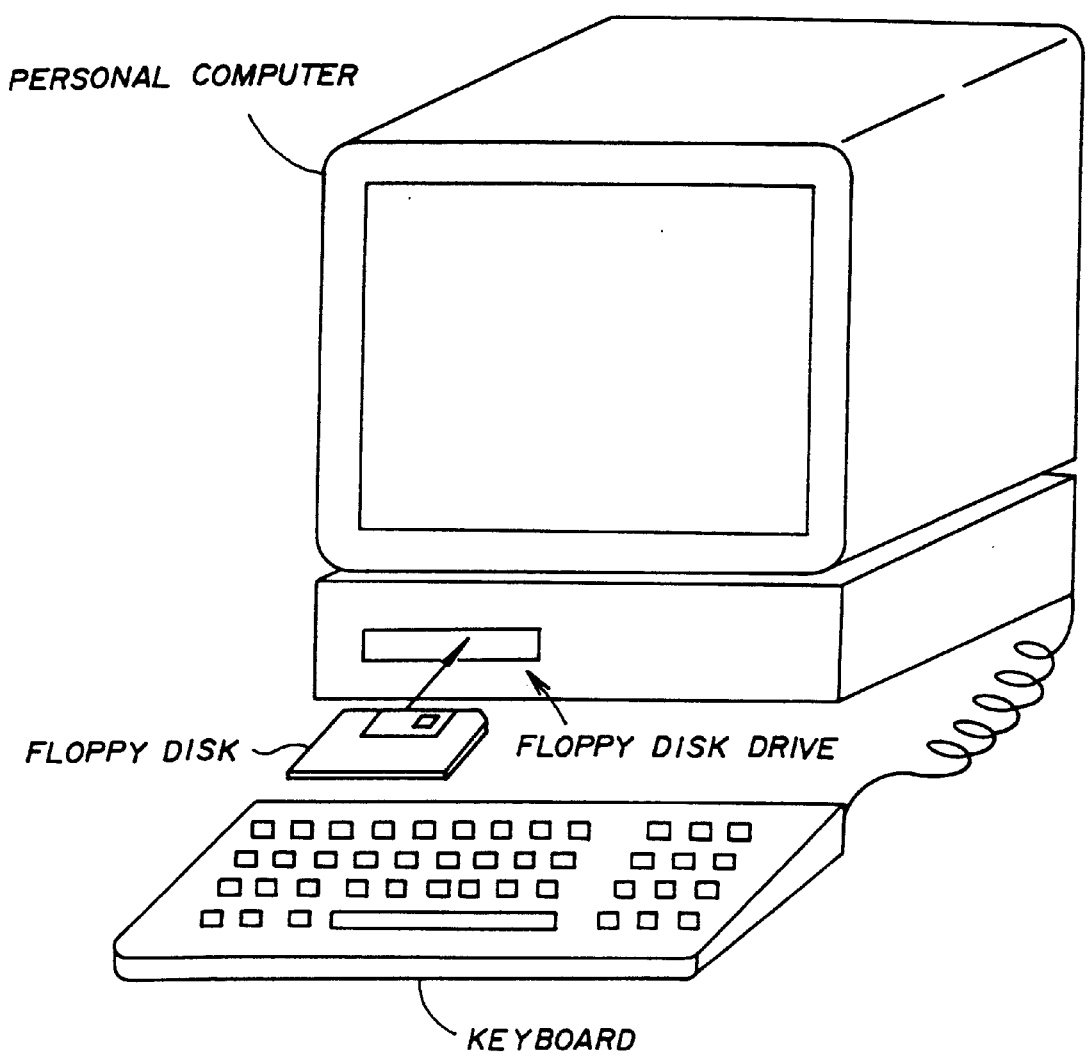
FIG. 32 shows a personal computer which can be used in the present invention.

As shown in FIG. 32, a general-purpose computer such as a personal computer shown in FIG. 32 can be used for performing the above-described image reading position error measurement. The general-purpose computer is specifically configured by software (stored in any information storage medium such as a floppy disk shown in FIG. 32) executed thereby to carry out the above-described image reading position error measurement.

Further, the present invention is not limited to the above-described embodiments, and variations and modifications may be made without departing from the scope of the present invention as claimed in the following claims.

What is claimed is:

1. An image reading position error measuring device, comprising:
   an oblique line pattern, located outside of an effective image area, comprising a plurality of oblique lines with a fixed inclination to the main scan direction;
   reading means, extending in the main scan direction, for reading said oblique line pattern together with the original image positioned in said effective image area;
   setting means for setting an image size change rate for the original image;
   sub-scanning means which changes an original image scanning speed in the sub-scan direction according to the image size change rate;
   first calculating means for setting a window on image data of said oblique line pattern obtained through said reading means, and calculating a center of gravity of the image data in the window;
   controlling means for controlling movement of the window according to a value of the center of gravity obtained through said first calculating means; and
   second calculating means for obtaining an image reading position error for each of the main scan lines based on the value of the center of gravity and the image size change rate.

2. An image reading apparatus, comprising:
   an oblique line pattern, located outside of an effective image area, comprising a plurality of oblique lines with a fixed inclination to the main scan direction;
   reading means, extending in the main scan direction, for reading said oblique line pattern together with the original image positioned in said effective image area;

setting means for setting an image size change rate for the original image;

sub-scanning means which changes an original image scanning speed in the sub-scan direction according to the image size change rate;

calculating means for obtaining an image reading position error for each of the main scan lines based on image data of said oblique line pattern obtained through said reading means; and image size changing means for converting image data of the original image so that a size of an image of said image data is changed according to the image size change rate in the main scan direction.

3. An image reading apparatus, comprising:

an oblique line pattern, located outside of an effective image area, comprising a plurality of oblique lines with a fixed inclination to the main scan direction;

reading means, extending in the main scan direction, for reading, through an optical system, said oblique line pattern together with the original image positioned in said effective image area;

setting means for setting an image size change rate for the original image;

image size changing means for changing a reading image size as a result of changing an arrangement of said optical system according to the image size change rate;

sub-scanning means which changes an original image scanning speed in the sub-scan direction according to the image size change rate;

converting means for obtaining image data of said oblique line pattern, a size of an image of said image data being unchanged in the main scan direction, based on image data of said oblique line pattern, obtained through said reading means, and the image size change rate; and calculating means for obtaining an image reading position error for each of the main scan lines based on the image data of said oblique line pattern obtained through said converting means.

4. An image reading position error measuring device, comprising:

an oblique line pattern, located outside of an effective image area, comprising a plurality of oblique lines with a fixed inclination to the main scan direction;

a reading unit, extending in the main scan direction, which reads said oblique line pattern together with the original image positioned in said effective image area;

a setting portion to set an image size change rate for the original image;

a sub-scanning portion which changes an original image scanning speed in the sub-scan direction according to the image size change rate;

a first calculating portion which sets a window on image data of said oblique line pattern obtained through said reading unit, and calculates a center of gravity of the image data in the window;

a controlling portion which controls movement of the window according to a value of the center of gravity obtained through said first calculating portion; and a second calculating portion which obtains an image reading position error for each of the main scan lines based on the value of the center of gravity and the image size change rate.

5. An image reading apparatus, comprising:

an oblique line pattern, located outside of an effective image area, comprising a plurality of oblique lines with a fixed inclination to the main scan direction;

a reading unit, extending in the main scan direction, which reads said oblique line pattern together with the original image positioned in said effective image area;

a setting portion to set an image size change rate for the original image;

a sub-scanning portion which changes an original image scanning speed in the sub-scan direction according to the image size change rate;

a calculating portion for obtaining an image reading position error for each of the main scan lines based on image data of said oblique line pattern obtained through said reading unit;

an image size changing portion which converts image data of the original image so that a size of an image of said image data be changed according to the image size change rate in the main scan direction.

6. An image reading apparatus, comprising:

an oblique line pattern, located outside of an effective image area, comprising a plurality of oblique lines with a fixed inclination to the main scan direction;

a reading unit, extending in the main scan direction, which reads, through an optical system, said oblique line pattern together with the original image positioned in said effective image area;

a setting portion to set an image size change rate for the original image;

an image size changing portion which changes a reading image size as a result of changing an arrangement of said optical system according to the image size change rate;

a sub-scanning portion which changes an original image scanning speed in the sub-scan direction according to the image size change rate;

a converting portion which obtains image data of said oblique line pattern, a size of an image of said image data being unchanged in the main scan direction, based on image data of said oblique line pattern, obtained through said reading unit, and the image size change rate; and a calculating portion which obtains an image reading position error for each of the main scan lines based on the image data of said oblique line pattern obtained through said converting portion.

7. A computer program product, comprising:

a computer usable medium having computer readable program code means embodied in said medium, said computer readable program code means comprising:

first program code means for setting a window on image data of an oblique line pattern obtained through reading means, and calculating a center of gravity of the image data in the window, said oblique line pattern being located outside of an effective image area and comprising a plurality of oblique lines with a fixed inclination to the main scan direction, and said reading means extending in the main scan direction and reading said oblique line pattern together with an original image positioned in said effective image area, the image data of said oblique line pattern being obtained when sub-scan means changes an original image scanning speed in the sub-scan direction according to an image size change rate set through setting means;

second program code means for controlling movement of the window according to a value of the center of gravity obtained through said first program code means; and third program code means for obtaining an image reading position error for each of the main scan lines based on the value of the center of gravity and the image size change rate.

* * * * *